US012771918B2

(12) United States Patent
Shimomura et al.

(10) Patent No.: US 12,771,918 B2
(45) Date of Patent: Oct. 20, 2026

(54) OPTICAL SYSTEM, IMAGE PICKUP APPARATUS, AND IN-VEHICLE SYSTEM

(71) Applicant: CANON KABUSHIKI KAISHA, Tokyo (JP)

(72) Inventors: Shunya Shimomura, Tochigi (JP); Masatsugu Nakano, Tochigi (JP); Naoto Doujou, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 19/088,704

(22) Filed: Mar. 24, 2025

(65) Prior Publication Data

US 2025/0310625 A1 Oct. 2, 2025

(30) Foreign Application Priority Data

Mar. 26, 2024 (JP) ................................ 2024-049496

(51) Int. Cl.

| | |
|---|---|
| ***H04N 23/55*** | (2023.01) |
| ***G01S 17/93*** | (2020.01) |
| ***G02B 7/00*** | (2021.01) |
| ***G02B 9/34*** | (2006.01) |
| ***G02B 9/62*** | (2006.01) |
| ***G02B 9/64*** | (2006.01) |
| ***G02B 13/00*** | (2006.01) |
| ***H04N 23/52*** | (2023.01) |

(52) U.S. Cl.

CPC ............ *H04N 23/55* (2023.01); *G01S 17/93* (2013.01); *G02B 7/008* (2013.01); *G02B 9/34* (2013.01); *G02B 9/62* (2013.01); *G02B 9/64* (2013.01); *G02B 13/004* (2013.01); *H04N 23/52* (2023.01)

(58) Field of Classification Search

CPC ........ H04N 23/52; H04N 23/55; G02B 7/008; G02B 9/34; G02B 9/62; G02B 9/64; G02B 13/004; G02B 13/0045; G02B 13/06; G02B 13/18; G01S 17/93

See application file for complete search history.

(56) References Cited

U.S. PATENT DOCUMENTS

2018/0239117 A1* 8/2018 Lee .................... G02B 27/0025
2022/0236520 A1 7/2022 Yokoyama

FOREIGN PATENT DOCUMENTS

JP 2022112893 A 8/2022

* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An optical system includes, in order from an object side to an image side, a first negative lens having an aspherical object-side surface, a second negative lens, a first positive lens, and a third negative lens. The first negative lens is disposed closest to an object, the aspherical surface has an inflection point in a cross section including an optical axis, the first positive lens is disposed adjacent to an aperture stop, and individual parameters are appropriately set.

19 Claims, 14 Drawing Sheets

L0

OPTICAL SYSTEM, IMAGE PICKUP APPARATUS, AND IN-VEHICLE SYSTEM

BACKGROUND

Technical Field

The present disclosure relates to an optical system and is suitable for an image pickup apparatus for use in, for example, an in-vehicle system, a surveillance system, or the like.

Description of the Related Art

Optical systems for use in in-vehicle cameras and surveillance cameras need to have a wide field of view even in dark environments. Plastic lenses are used to constitute such an optical system that can easily form various aspherical surfaces.

Japanese Patent Laid-Open No. 2022-112893 discloses an optical system including a plurality of plastic lenses.

SUMMARY

According to some embodiments of the present disclosure, there is provided an optical system including, in order from an object side to an image side, a first negative lens having an aspherical object-side surface; a second negative lens; a first positive lens; and a third negative lens, wherein the first negative lens is disposed closest to an object, the aspherical surface has an inflection point in a cross section including an optical axis, the first positive lens is disposed adjacent to an aperture stop, and an inequality below is satisfied:

$$-1.20 < f(1/fp1 + 1/fp2 + 1/fp3) < 0.30,$$

where fp1 is a focal length of the first plastic lens, fp2 is a focal length of the second plastic lens, fp3 is a focal length of the third plastic lens, and f is a focal length of the entire optical system.

Further features of various embodiments of the present disclosure will become apparent from the following description of exemplary embodiments with reference to the attached drawings.

DESCRIPTION OF THE EMBODIMENTS

Figure 1:
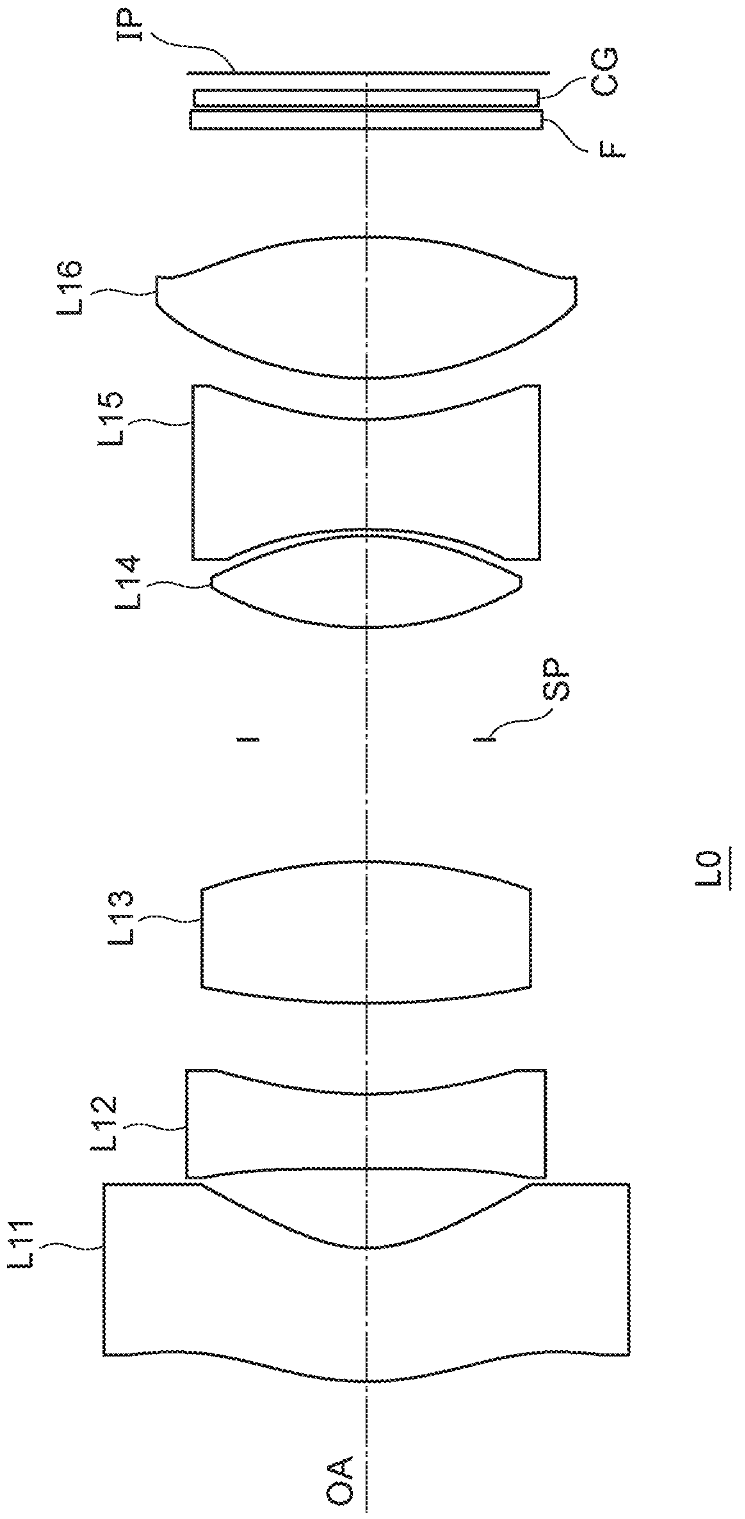
FIG. 1 is a cross-sectional view of an optical system according to a first example.
Figure 2:
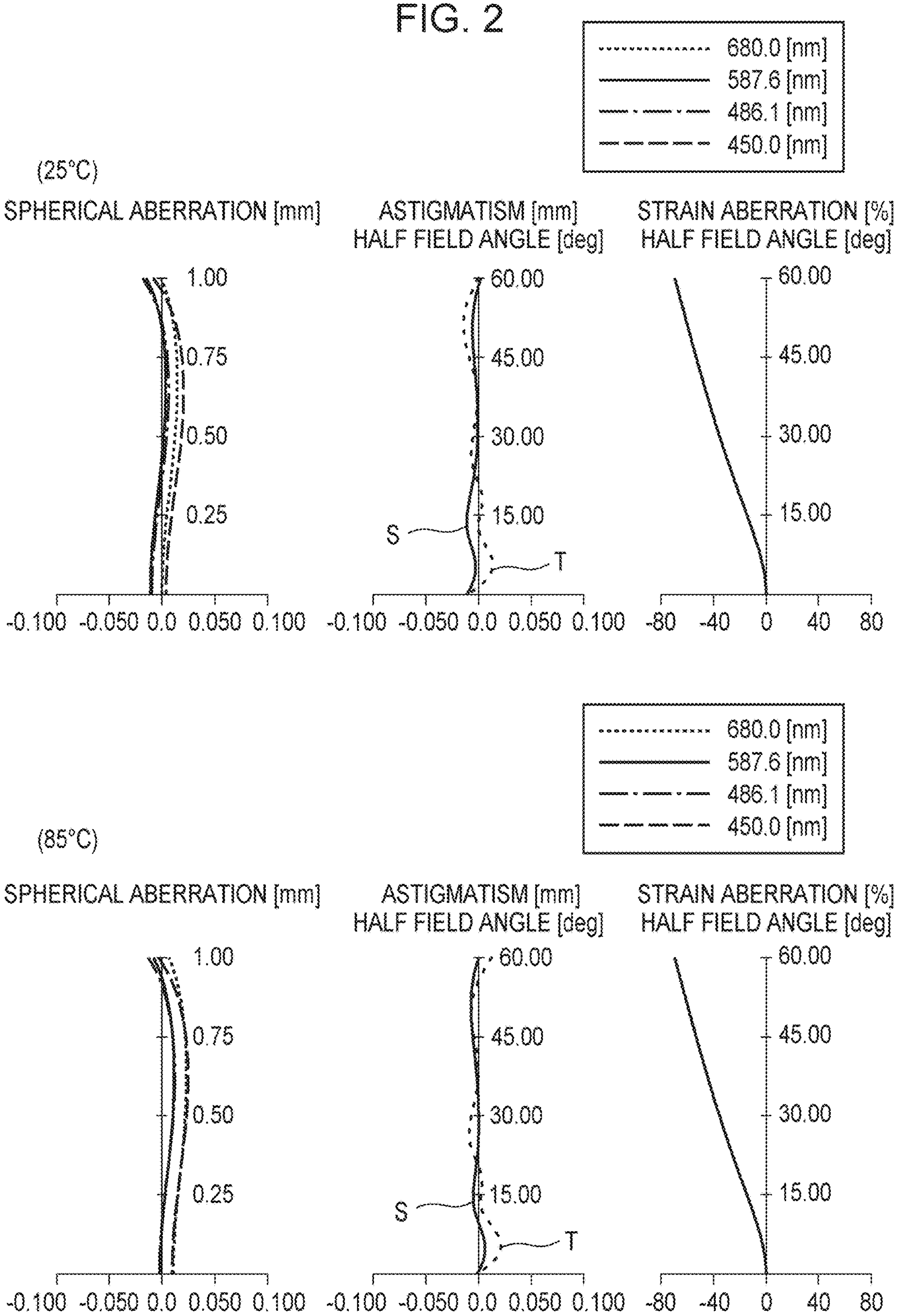
FIG. 2 is an aberration diagram of the optical system according to the first example.
Figure 3:
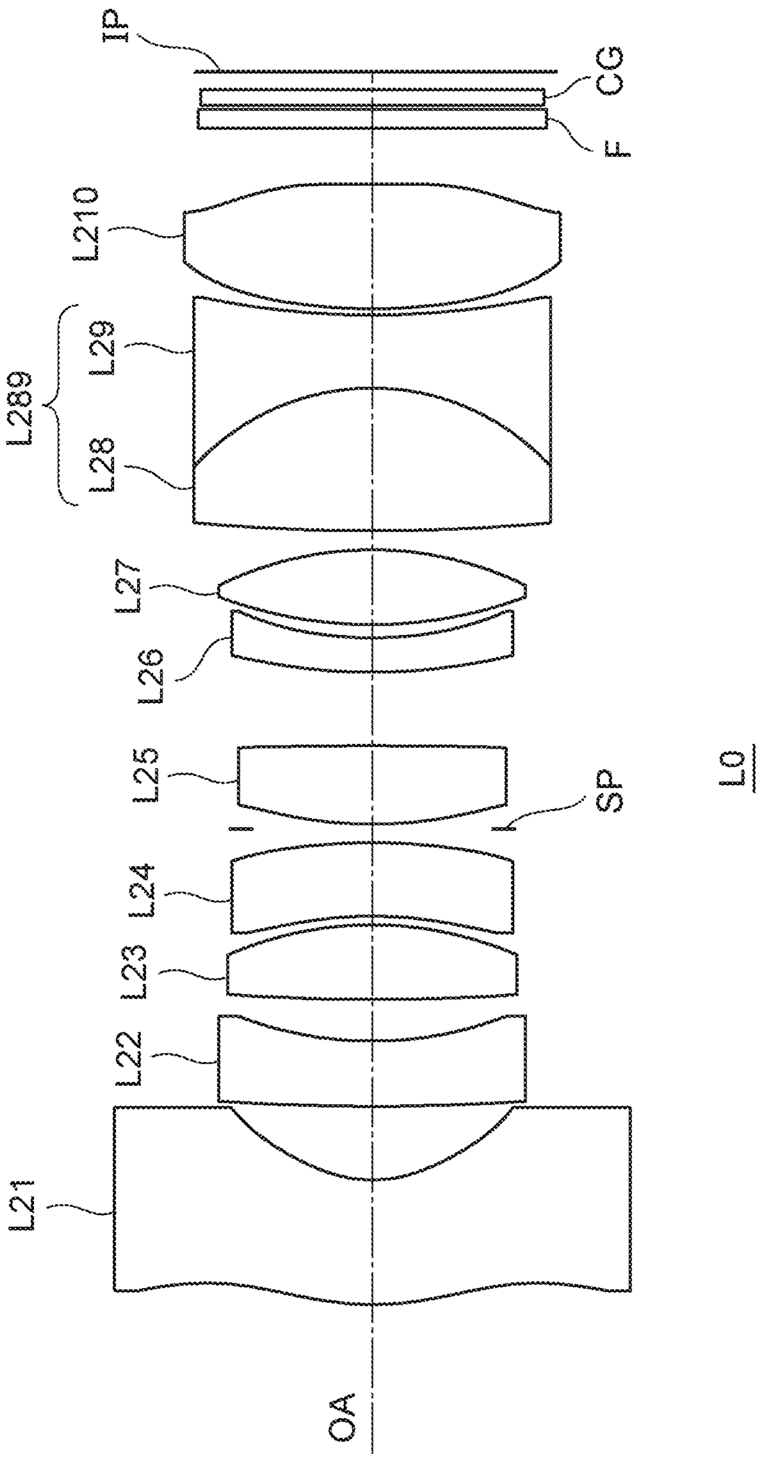
FIG. 3 is a cross-sectional view of an optical system according to a second example.
Figure 4:
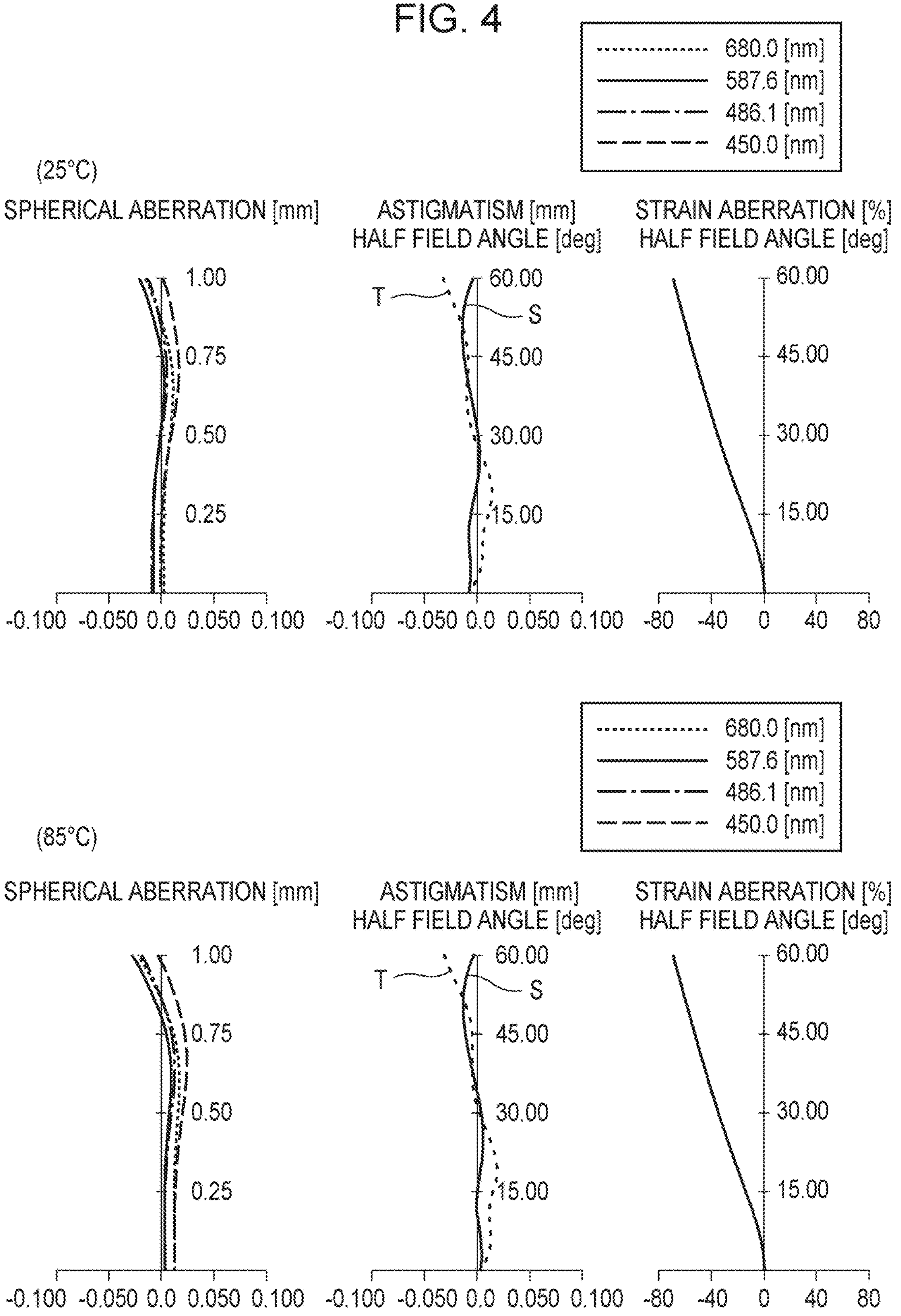
FIG. 4 is an aberration diagram of the optical system according to the second example.
Figure 5:
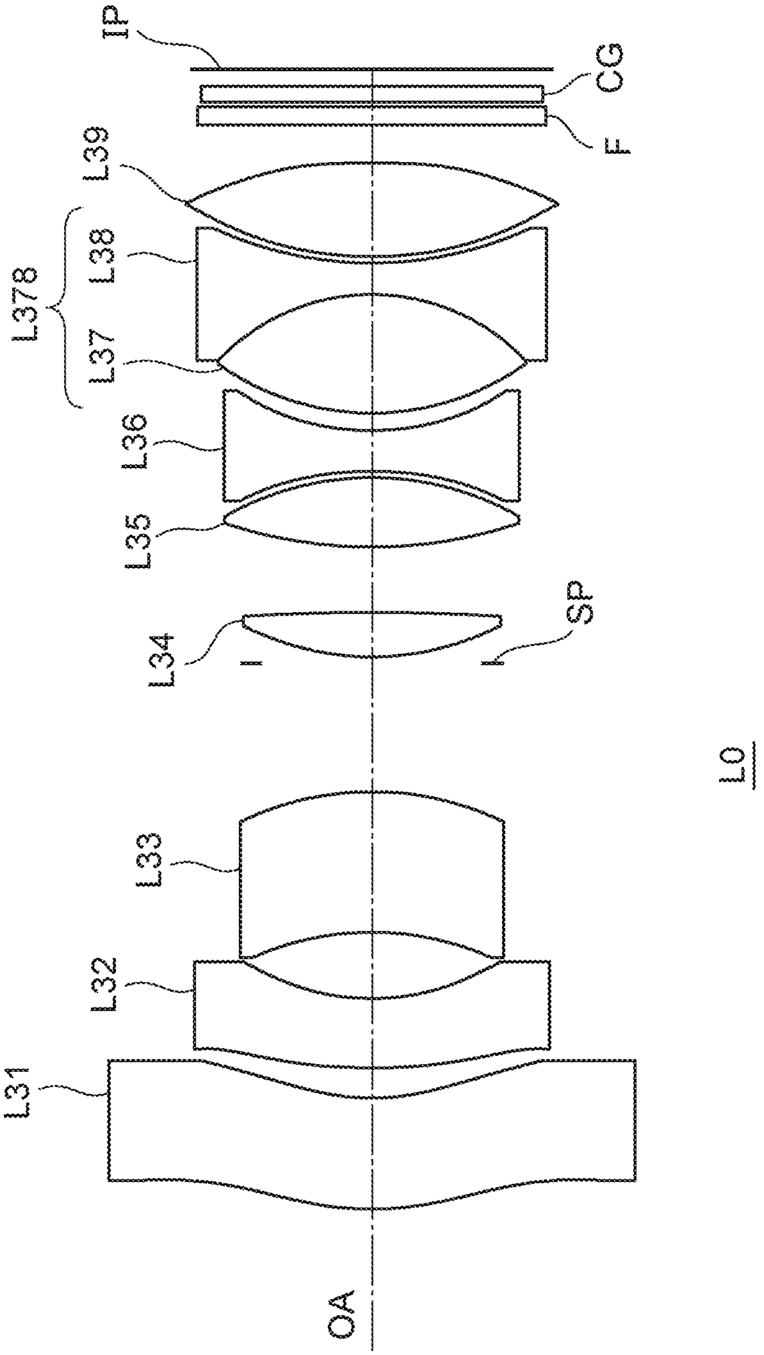
FIG. 5 is a cross-sectional view of an optical system according to a third example.
Figure 6:
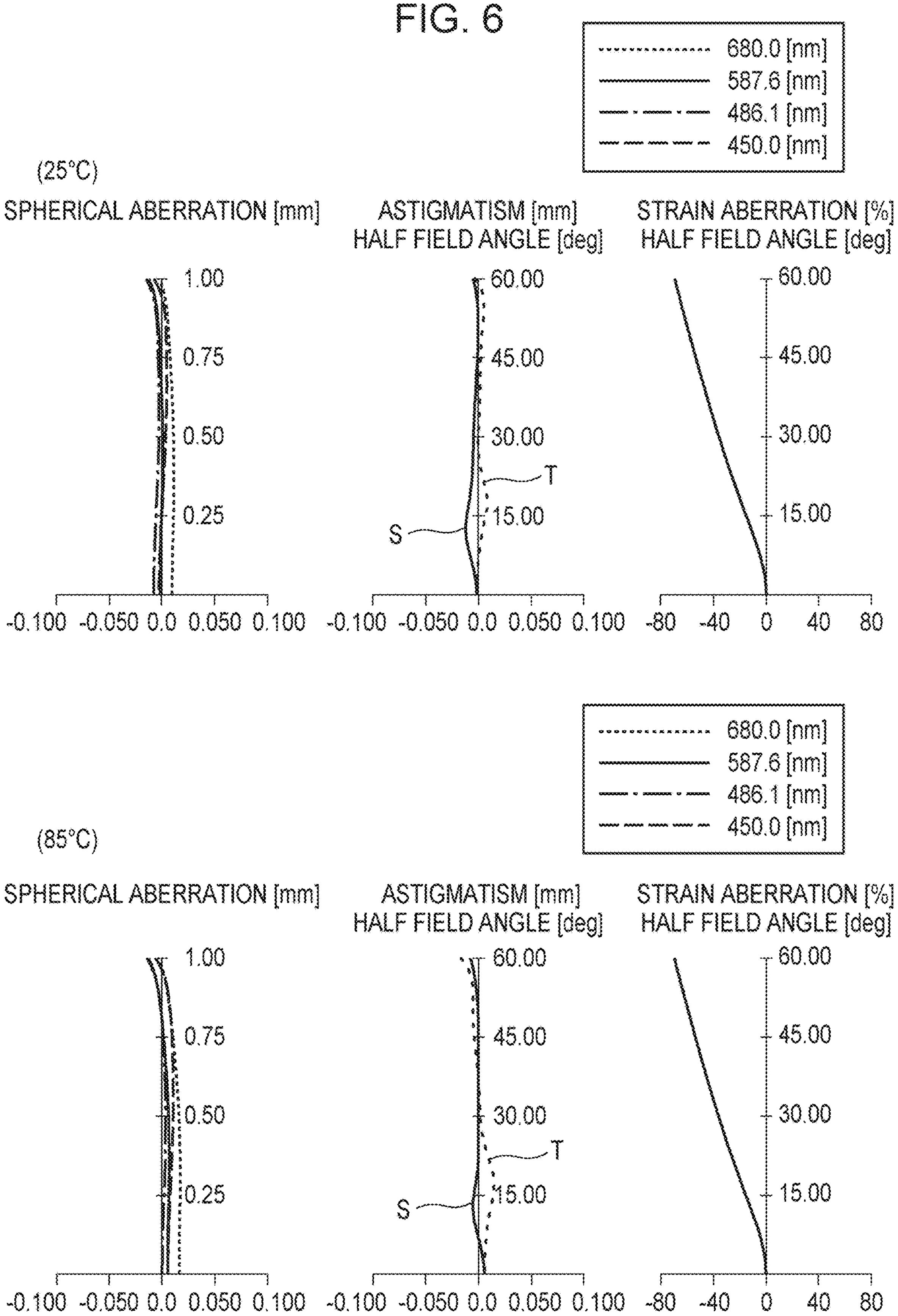
FIG. 6 is an aberration diagram of the optical system according to the third example.
Figure 7:
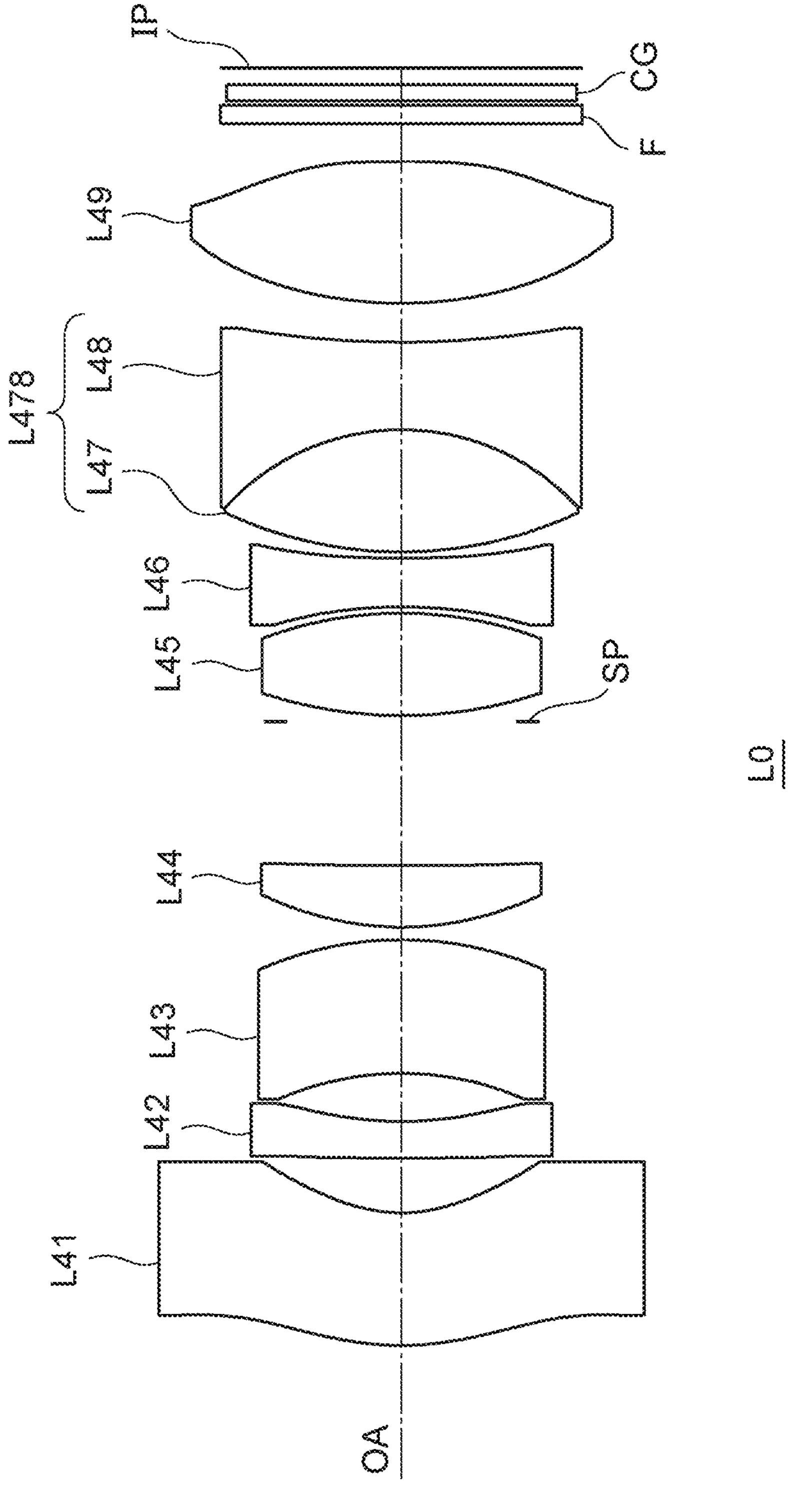
FIG. 7 is a cross-sectional view of an optical system according to a fourth example.
Figure 8:
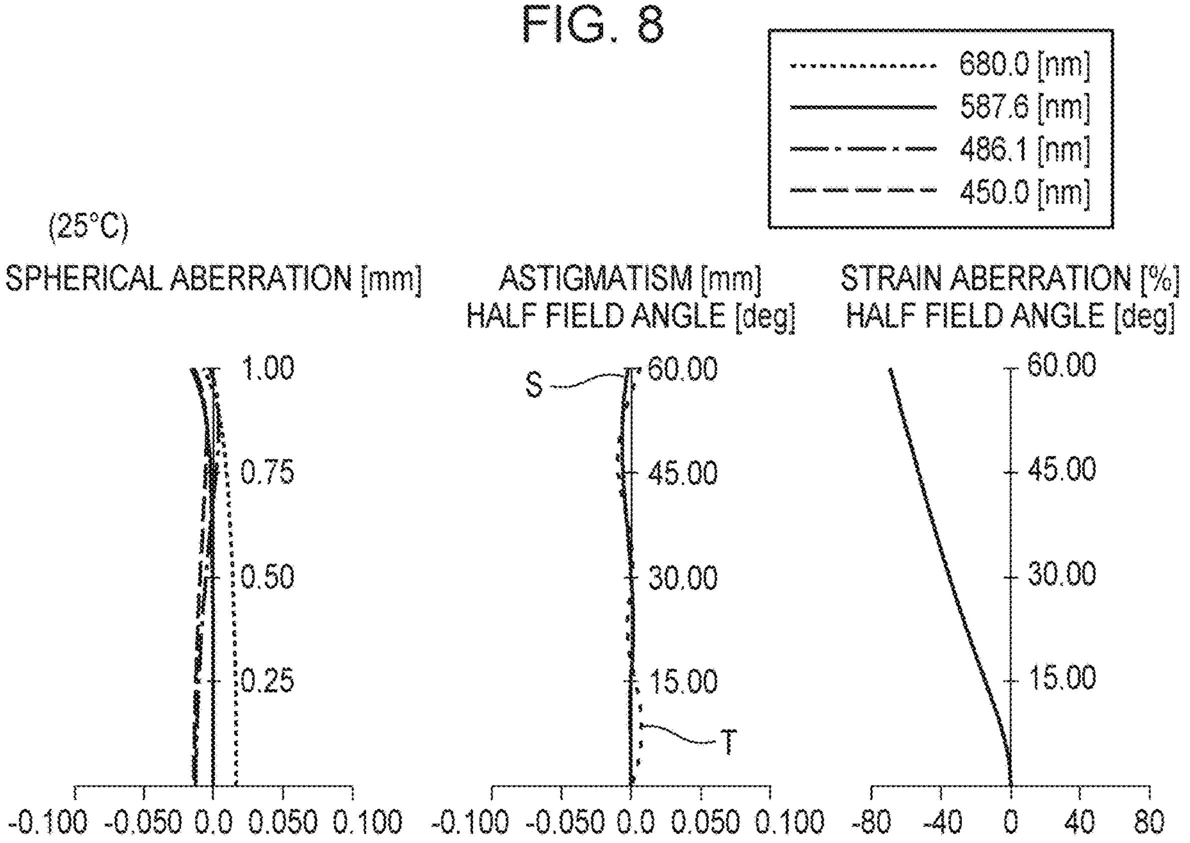
FIG. 8 is an aberration diagram of the optical system according to the fourth example.
Figure 8:
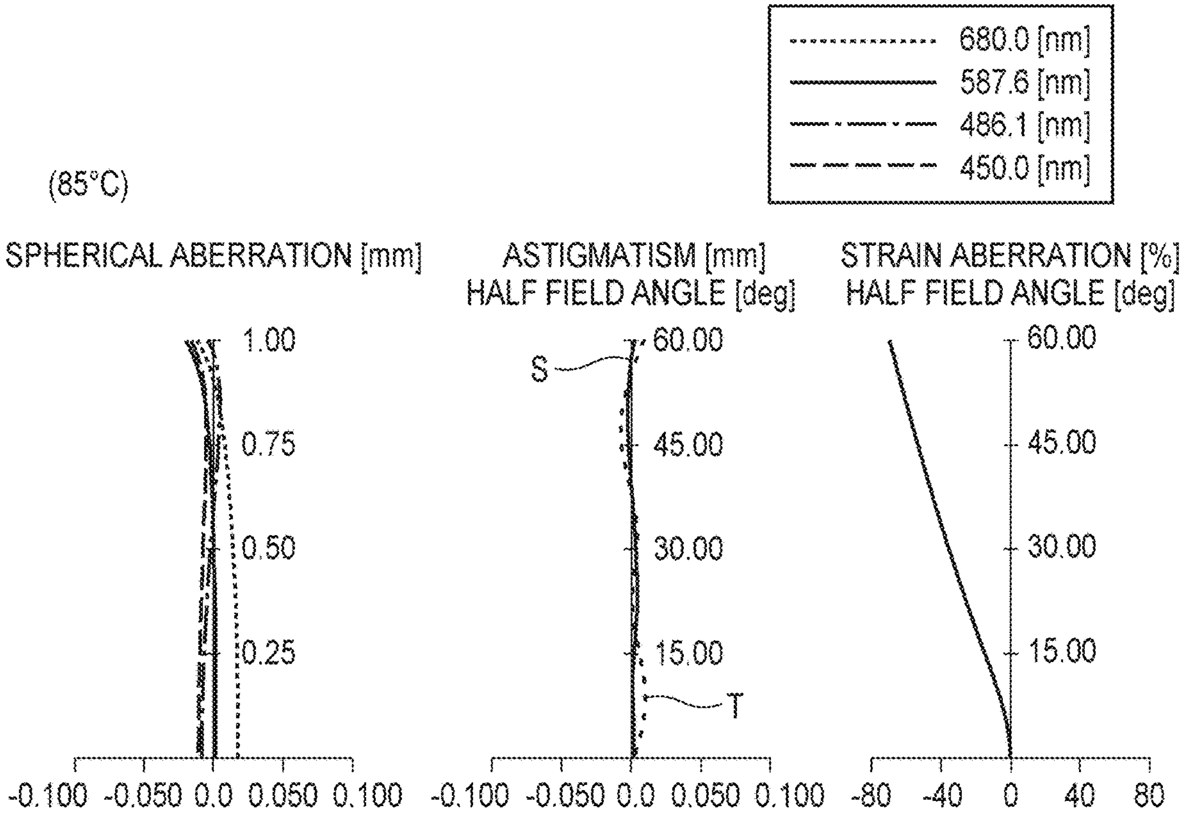
Figure 9:
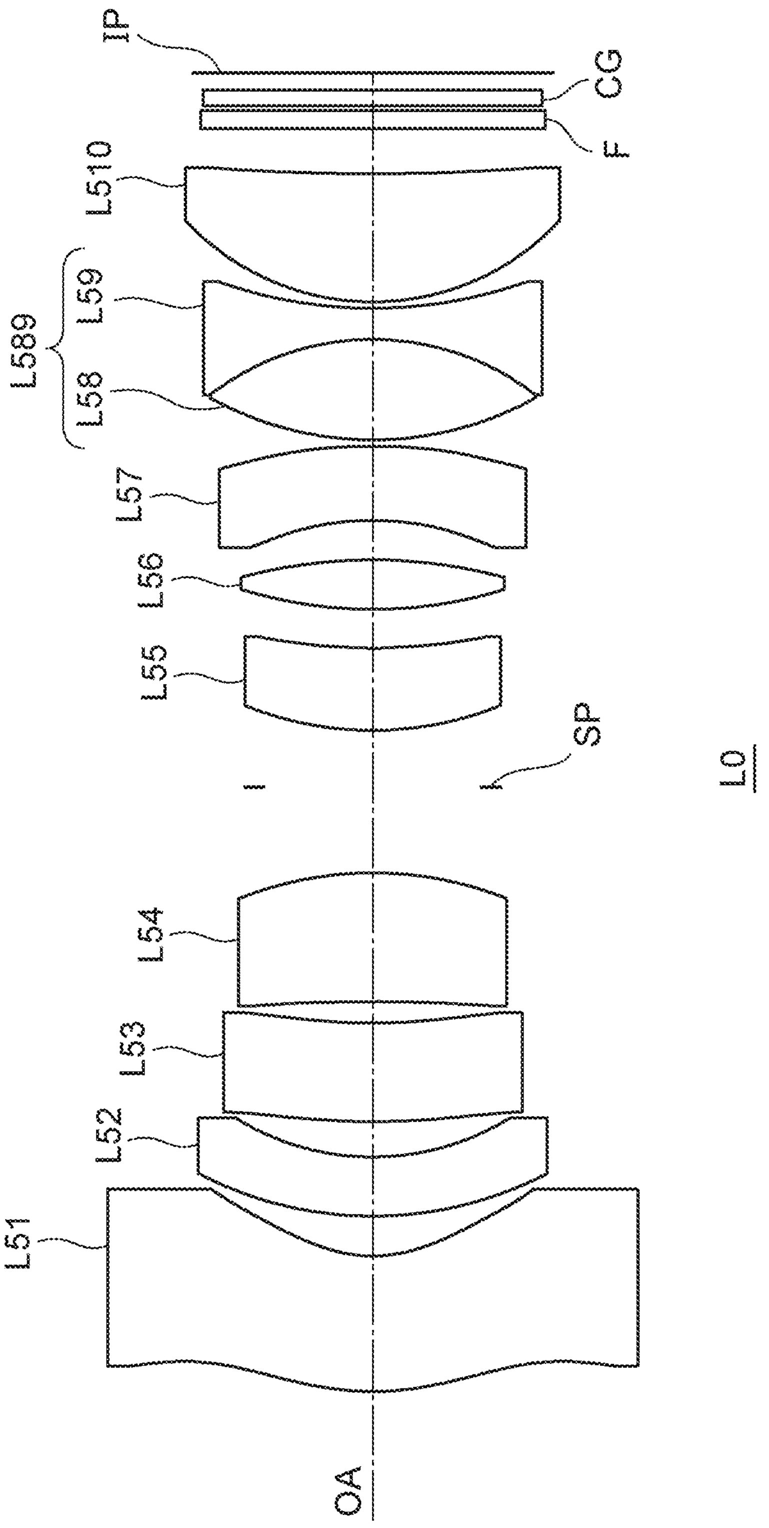
FIG. 9 is a cross-sectional view of an optical system according to a fifth example.
Figure 10:
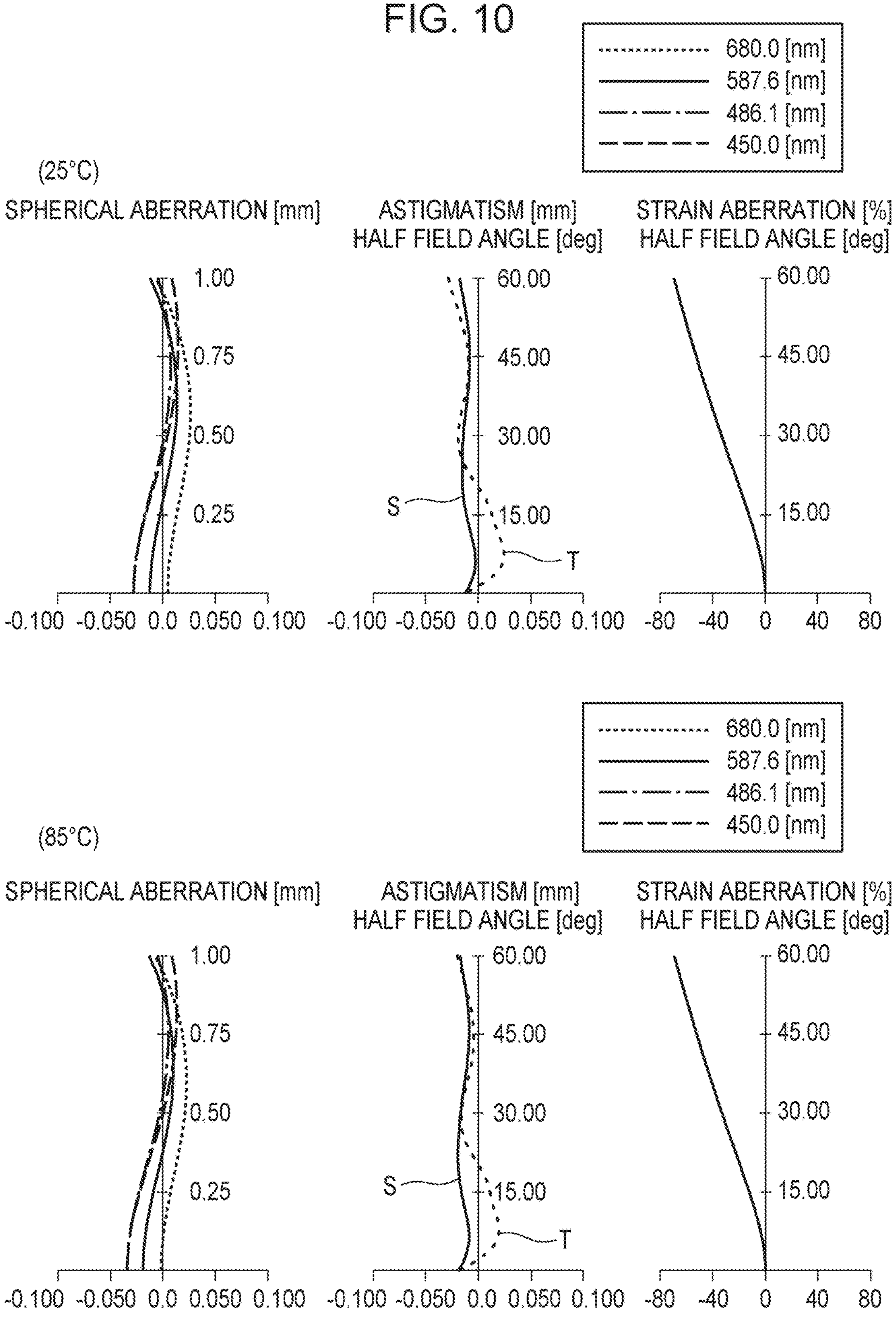
FIG. 10 is an aberration diagram of the optical system according to the fifth example.

Although the present disclosure describes exemplary embodiments, it is to be understood that some embodiments are not limited to the disclosed exemplary embodiments. It should be noted that the drawings may be drawn on a scale different from the actual size for convenience. In addition, the same members are denoted by the same reference numerals in the drawings, and redundant descriptions thereof are omitted.

FIGS. 1, 3, 5, 7, and 9 are cross-sectional views of optical systems according to the first to fifth examples, respectively. In these drawings, the left side is an object side (front side), and the right side is an image side (rear side).

In the drawings, Li (i is a natural number) indicates the i-th lens group from the object side to the image side of lens groups included in each of optical systems L0.

In addition, in the drawings, SP represents an aperture stop that determines the light flux of the opening F-number (Fno), and IP represents an image plane. When the optical systems L0 according to the individual examples are used as image pickup optical systems for digital video cameras or digital still cameras, the image pickup plane of a solid-state image pickup element (photoelectric conversion element) is disposed on an image plane IP. Charge coupled device (CCD) sensors or complementary metal oxide semiconductor (CMOS) sensors can be used as solid-state image pickup elements. When the optical systems L0 according to the individual examples are used as image pickup optical systems for silver-halide film cameras, the photosensitive surface of the film is disposed on the image plane IP. In the optical systems L0 according to the individual examples, an infrared (IR) cut filter F as an optical filter and a cover glass CG are disposed on the image side of the final lens.

It should be noted that the optical systems according to the individual examples may also be used as projection lenses for projectors or the like. In this case, the left side is a screen side, and the right side is a projected image side.

FIGS. 2, 4, 6, 8, and 10 are aberration diagrams of the optical system L0 according to the first to fifth examples at room temperature (25° C.) and high temperature (85° C.).

In each of the spherical aberration diagrams, a solid line represents the spherical aberration with respect to the d-line (wavelength of 587.56 nm), and a dot-dot-dash line represents the spherical aberration with respect to the g-line (wavelength of 435.835 nm). In the astigmatism diagrams, a solid line represents the astigmatism with respect to the d-line on a sagittal image plane, a dashed line represents the spherical aberration with respect to the d-line on a meridional image plane. The strain diagrams illustrate the strain with respect to the d-line. The chromatic aberration diagrams illustrate the magnification chromatic aberration with respect to the g-line.

Next, the characteristic structures of the optical systems L0 according to the individual examples will be described.

First, changes in the focal length of a single lens when environmental temperature changes will be described. An optical system used in an image pickup apparatus can suppress the fluctuation of the focal position caused by changes in environmental temperature (temperature compensation).

Here, in any single lens of the optical system, it is assumed that h is the incident height (the diameter of a light flux incident on the single lens) of an axial light ray and f is the focal length of the lens. In addition, it is known that the change Δf in the focal length when the environmental temperature changes satisfies expression (A) below, where dn/dt is the temperature coefficient of the refractive index, ΔT is the amount of temperature change, and N is the refractive power of the lens.

$$\Delta f \propto -h^{\wedge}2\times(1/f)\times(dn/dT)\times\Delta T/(N-1) \quad \text{(A)}$$

According to expression (A), if the temperature coefficient of the refractive index is a negative value when the environmental temperature rises, the change in the focal length due to a change in the refractive index is positive for a positive lens or negative for a negative lens.

In addition, according to expression (A), the degree of the change in the focal length increases in proportion to the square of the incident height of an axial light ray, the focal length of the lens, the temperature coefficient of the refractive index, and the reciprocal of the refractive index.

As for the temperature coefficient of the refractive index, the temperature coefficient of the refractive index of a plastic lens is negative. In addition, the absolute value of a negative temperature coefficient of the refractive index of a plastic lens is larger than the temperature coefficient of the refractive index of a glass lens. Accordingly, in an optical system including plastic lenses, the variation in the focal length when an environmental temperature changes becomes larger. It should be noted that plastic in the individual examples may be a resin or resin material in which inorganic fine particles are dispersed.

In such an optical system, for temperature compensation, a plastic lens with negative refractive power is disposed in each of the optical systems L0 according to the individual examples to cancel the change in the focal length of a plastic lens with positive refractive power.

For example, when the temperature rises, the focal length of a plastic lens with negative refractive power changes negatively when the focal length of a plastic lens with positive refractive power changes positively, and accordingly, the entire change in the focal position is cancelled.

In addition, the closer to zero the sum of the values of expression (A) for the individual plastic lenses, the more effective the temperature compensation.

However, according to expression (A), the amount of variation in the focal position when the environmental temperature changes is proportional to the square of the incident height of an axial light ray. Accordingly, if a plastic lens with positive refractive power is disposed at a position on the optical axis at which the diameter of a light flux is increased, the negative refractive power needs to be excessively increased for temperature compensation using one plastic lens with negative refractive power. As a result, various aberrations in plastic lenses with negative refractive power are more likely to occur. In addition, it becomes difficult to achieve good optical characteristics acquired by a plastic lens with negative refractive power and other lenses at room temperature.

Accordingly, in the present example, for temperature compensation of a plastic lens with positive refractive power, a plastic lens with negative refractive power is disposed on each of the object side and the image side of the plastic lens with positive refractive power.

In the structure described above, the negative refractive power necessary for temperature compensation can be distributed and various aberrations can be corrected well. A plastic lens with negative refractive power can be disposed on each of the object side and the image side of the aperture stop. In the structure described above, the comatic aberration corrected by the plastic lens with negative refractive power can be corrected well even when the environmental temperature changes.

Next, the following will describe an optical system that has a high resolution in the screen center region while having a wide field angle.

For example, in in-vehicle cameras and surveillance cameras, an optical system that achieves both a wide field angle for monitoring a wide range of field angle and a telephoto characteristic with a high resolution in the screen center region is required.

Here, the distortion that indicates the deviation of an actual image height Y on an image plane from an ideal image height Yi is expressed by the following equation.

$$\text{Distortion (\%)} = 100\times(Y-Yi)/Y \quad \text{(B)}$$

In addition, the orthogonal projection method represented by the following equation is known as the projection method of an optical system that compresses an image around the screen more strongly than an image near the optical axis where Y is the image height on the projecting surface, f is the focal length of the entire optical system, and θ is the half field angle.

$$Y = f\times\sin\theta \quad \text{(C)}$$

In an optical system that has a high resolution in the screen center region, an optical system with a projective characteristic equal to or more than that of the orthogonal projection illustrated in equation (C) is required.

A lens with an aspherical lens surface having a region in which the curvature changes from positive to negative toward the outside from the vicinity of the optical axis can be disposed closest to an object of the optical system to achieve the optical system described above. In the aspherical surface described above, since the refraction of light decreases in a low field angle region, the distortion in the screen center region indicated by equation (B) acts in the plus direction, and the distortion in a peripheral region acts in the minus direction because the refraction of light increases in the off-axis region. Accordingly, it is possible to achieve an optical system that has a wide field angle and a high resolution in the screen center region.

In the optical system according to the present example, the object-side surface of the lens (first negative lens, first aspherical lens) with negative refractive power disposed closest to the object is an aspherical surface. In the structure described above, strain is suppressed by reducing the refraction of light in the screen center region, and distortion acts in the minus direction by increasing the refraction of light in the peripheral region. As a result, a projective characteristic equal to or more than that of the orthogonal projection can be easily achieved. In addition, the aspherical object-side surface of the first aspherical lens has an inflection point in a cross section including the optical axis OA. In the structure described above, the field angle of the optical system can be easily widened while the number of lenses that constitute the optical system is reduced.

Figure 11:
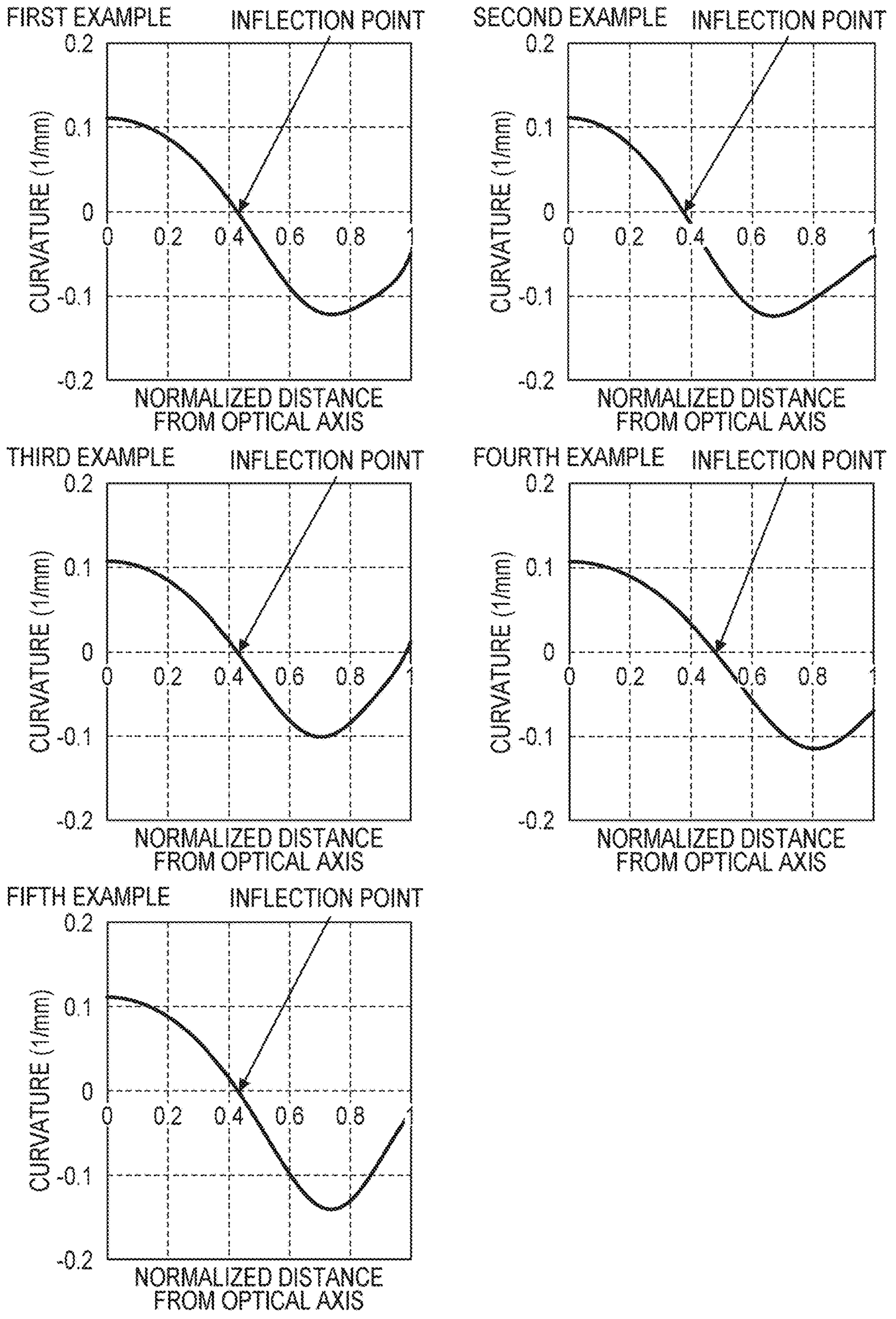
FIG. 11 depicts diagrams illustrating the local curvatures of object-side surfaces of first aspherical lenses according to the individual examples.

Here, the aspherical shapes of the first aspherical lenses according to the individual examples are illustrated in FIG. 11. In FIG. 11, the horizontal axis represents the position in the radial direction in a cross-section including an optical axis OA of the aspherical surface of the first aspherical lens, and the vertical axis represents the curvature (1/mm) of the lens surface of the first aspherical lens. That is, FIG. 11 illustrates graphs plotting the curvature of the aspherical surface at positions on of each of the first aspherical lenses. It should be noted that the numerical values on the horizontal axis indicate the distances (defined distance) from the optical axis OA to the positions within the effective diameter of the aspherical surface of the first aspherical lens when the distance from the optical axis OA to the effective diameter (maximum effective diameter) is normalized to 1.

As illustrated in FIG. 11, the aspherical object-side surfaces of the first aspherical lenses according to the individual examples are aspherical surfaces having inflection points in cross sections including the optical axis OA.

Each of the optical systems L0 according the individual examples includes a first aspherical lens with negative refractive power, a first plastic lens with negative refractive power, a second plastic lens with positive refractive power, and a third plastic lens with negative refractive power that are disposed in this order from the object side to the image side. The plastic lenses can be manufactured more inexpensively than lenses made of glass materials or the like due to excellent mass production capabilities even with a complex aspherical shape.

In each of the optical systems L0 according to the individual examples, a second plastic lens with positive refractive power is disposed adjacent to an aperture stop SP. In the structure described above, various aberrations expanded by a light flux expanded by the first aspherical lens with negative refractive power can be corrected well.

Here, the conditions that can be satisfied by the optical systems L0 according to the individual examples will be described.

Each of the optical systems L0 according to the individual examples can have a positive lens between the first aspherical lens and the second plastic lens with positive refractive power. In the structure described above, various aberrations can be suppressed from occurring by distributing the positive refractive power by using the positive lens disposed on the object side of the second plastic lens with positive refractive power.

In the optical systems L0 according to the individual examples, a lens with an aspherical surface can be disposed closest to the image plane. In the structure described above, the field curvature can be corrected well.

The optical systems L0 according to the individual examples satisfy inequality (1) below, where fp1 is the focal length of the first plastic lens, fp2 is the focal length of the second plastic lens, fp3 is the focal length of the third plastic lens, and f is the focal length of the entire optical system L0. It should be noted that these values are assumed to be determined at room temperature (25° C.).

$$-1.20 < f(1/fp1 + 1/fp2 + 1/fp3) < 0.30 \quad (1)$$

When the upper limit value of inequality (1) is exceeded, the change in the refractive power of the plastic lens with positive refractive power when the environmental temperature changes is larger, and accordingly, temperature compensation becomes difficult. On the other hand, when the lower limit value of inequality (1) is not reached, the change in the refractive power of the plastic lens with negative refractive power when the environmental temperature changes is larger, and accordingly, temperature compensation becomes difficult.

In addition, in some embodiments, the numerical range of inequality (1) is more preferably the numerical range of inequality (1a), shown below.

$$-1.00 < f(1/fp1 + 1/fp2 + 1/fp3) < 0.25 \quad (1a)$$

Furthermore, in some embodiments, the numerical range of inequality (1a) is even more preferably the numerical range of inequality (1b), shown below.

$$-0.90 < f(1/fp1 + 1/fp2 + 1/fp3) < 0.20 \quad (1b)$$

The optical systems L0 according to the individual examples can satisfy inequality (2), shown below, where y(θ) is the projective characteristic representing the relationship with the image height y, θ (°) is the half field angle, and θmax (degree) is the maximum half field angle.

$$1.00 < f \times \sin(\theta max)/y(\theta max) \leq 1.90 \quad (2)$$

A projective characteristic equal to or more than that of the orthogonal projection can be satisfied, and a wide field angle and a high resolution in the screen center region can be achieved by the optical system being formed to satisfy inequality (2).

When the upper limit value of inequality (2) is exceeded, the resolution of the screen center region is excessively high and the resolution of a peripheral field angle decreases, and accordingly, it becomes difficult to acquire information in a peripheral region in the wide field angle range.

On the other hand, when the lower limit value of inequality (2) is not reached, it becomes difficult to achieve a projective characteristic equal to or more than that of the orthogonal projection.

It should be noted that, in some embodiments, the numerical range of inequality (2) is more preferably the numerical range of inequality (2a), shown below. In addition, in some embodiments, the numerical range of inequality (2a) is even more preferably the numerical range of inequality (2b), shown below.

$$1.00 < f \times \sin(\theta max)/y(\theta max) \leq 1.80 \quad (2a)$$

-continued $$1.00 < f \times \sin(\theta\text{max})/y(\theta\text{max}) \leq 1.70 \quad (2b)$$

Next, the optical systems L0 according to the individual examples can satisfy inequality (3), shown below, where GnL is the distance from the surface vertex of the object-side lens surface of the first plastic lens with negative refractive power to the surface vertex of the object-side lens surface of the third plastic lens with negative refractive power.

$$0.10 < GnL/TL < 0.70 \quad (3)$$

In the present example, since the plastic lens with positive refractive power is disposed at a position on the optical axis at which the diameter of a light flux is large, the distance between the plastic lens with positive refractive power and the plastic lens with negative refractive power is large. Accordingly, the larger the diameter of the light flux passing through the plastic lens with negative refractive power, the larger the negative refractive power necessary for temperature compensation.

On the other hand, the smaller the distance between the plastic lens with positive refractive power and the plastic lens with negative refractive power and the larger the diameter of the light flux passing through the plastic lens with negative refractive power, the smaller the negative refractive power necessary for temperature compensation. The effect of temperature compensation can be improved by the first plastic lens and the third plastic lens with negative refractive power being disposed so as to satisfy inequality (3).

When the upper limit value of inequality (3) is exceeded, the negative refractive power of the plastic lens necessary for temperature compensation increases, and accordingly, it becomes difficult to achieve both temperature compensation and correction of various aberrations. On the other hand, when the lower limit value of inequality (3) is not reached, the negative refractive power of the plastic lens decreases, and accordingly, it becomes difficult to well correct various aberrations.

It should be noted that, in some embodiments, the numerical range of inequality (3) is more preferably the numerical range of inequality (3a), shown below. In addition, in some embodiments, the numerical range of inequality (3a) is even more preferably the numerical range of inequality (3b) shown below.

$$0.15 < GnL/TL < 0.65 \quad (3a)$$

$$0.20 < GnL/TL < 0.60 \quad (3b)$$

Next, STL is assumed to be the distance from the surface vertex of the object-side lens surface of the first aspherical lens, which is disposed closest to the object, to the aperture stop SP. The optical systems L0 according to the individual examples can satisfy inequality (4), shown below, where GpL is the distance from the surface vertex of the object-side lens surface of the first aspherical lens to the surface vertex of the lens surface of the second plastic lens with positive refractive power close to the aperture stop SP.

$$0.70 < STL/GpL < 1.40 \quad (4)$$

In the optical systems L0 according to the individual examples, various aberrations can be corrected well by the aperture stop SP being disposed at an appropriate position behind the lens group with negative refractive power and the second plastic lens with positive refractive power being disposed adjacent to the aperture stop SP.

When the upper limit value of inequality (4) is exceeded or the lower limit value of inequality (4) is not reached, the distance between the aperture stop SP and the second plastic lens with positive refractive power is increased to lower the incident height with respect to the aspherical lens, and accordingly, correction of various aberrations becomes difficult.

It should be noted that, in some embodiments, the numerical range of inequality (4) is more preferably the numerical range of inequality (4a) shown below. In addition, in some embodiments, the numerical range of inequality (4a) is even more preferably the numerical range of inequality (4b) shown below.

$$0.75 < STL/GpL < 1.35 \quad (4a)$$

$$0.80 < STL/GpL < 1.30 \quad (4b)$$

Next, the optical systems L0 according to the individual examples can satisfy inequality (5), shown below, where θ1 is the maximum value of the angle formed by the plane normal and the optical axis, and w is the maximum half field angle on the image-side surface of the first aspherical lens. It should be noted that the half field angle may be defined as the half field angle of light focused at the end portion of an image circle of the optical system L0 or may be defined as the half field angle of light focused at the maximum image height of the image sensor of the image pickup apparatus to which the optical system L0 is attached.

$$0.10 < \theta 1/w < 1.00 \quad (5)$$

In the optical systems L0 according to the individual examples, it is possible to create a surface shape that easily forms an anti-reflection film on the aspherical lens by reducing the angle (referred to below as the angular aperture) formed by the optical axis and the plane normal of the image-side surface of the first aspherical lens. An anti-reflection film can be uniformly applied to the image-side surface by setting the angular aperture of the image-side surface of the first aspherical lens so as to satisfy inequality (5).

When the upper limit value of inequality (5) is exceeded, it becomes difficult to form a uniform film shape on the image-side surface.

On the other hand, when the lower limit value of inequality (5) is not reached, it becomes difficult to place a lens with negative refractive power necessary for a wide field angle.

It should be noted that, in some embodiments, the numerical range of inequality (5) is more preferably the numerical range of inequality (5a) shown below. In addition, in some embodiments, the numerical range of inequality (5a) is even more preferably the numerical range of inequality (5b) shown below.

$$0.15 < \theta 1/w < 0.95 \quad (5a)$$

$$0.20 < \theta 1/w < 0.90 \quad (5b)$$

Next, the optical systems L0 according to the individual examples can satisfy inequality (6), shown below, where fp2 is the focal length of the second plastic lens with positive refractive power.

$$0.80 < fp2/f < 7.00 \quad (6)$$

A temperature-compensated optical system having a wide field angle and bright illumination can be achieved by setting the focal length of the second plastic lens with positive refractive power so as to satisfy inequality (6).

When the upper limit value of inequality (6) is exceeded, the positive refractive power of the second plastic lens is larger, and accordingly, temperature compensation by the plastic lenses with negative refractive power becomes difficult. On the other hand, when the lower limit value of inequality (6) is not reached, convergence of an off-axis light flux becomes difficult, and accordingly, achievement of an optical system with bright illumination becomes difficult.

It should be noted that, in some embodiments, the numerical range of inequality (6) is more preferably the numerical range of inequality (6a), shown below. In addition, in some embodiments, the numerical range of inequality (6a) is even more preferably the numerical range of inequality (6b), shown below.

$$0.85 < fp2/f < 6.50 \quad (6a)$$

$$0.90 < fp2/f < 6.00 \quad (6b)$$

Next, the optical systems L0 according to the individual examples can satisfy inequality (7), shown below, where fG1 is the focal length of the first aspherical lens. It is easy to widen the field angle and improve the performance of the optical system by setting the focal length of the first aspherical lens so as to satisfy inequality (7).

$$-15.0 < fG1/f < -1.00 \quad (7)$$

When the upper limit value of inequality (7) is exceeded, the negative refractive power of the first aspherical lens increases, and accordingly, it becomes difficult to well correct various aberrations. On the other hand, when the lower limit value of inequality (7) is not reached, it becomes difficult to place a lens with negative refractive power necessary for wide field angle.

It should be noted that, in some embodiments, the numerical range of inequality (7) is more preferably the numerical range of inequality (7a) shown below. In addition, in some embodiments, the numerical range of inequality (7a) is even more preferably the numerical range of inequality (7b) shown below.

$$-13.0 < fG1/f < -1.40 \quad (7a)$$

-continued $$-11.0 < fG1/f < -1.80 \quad (7b)$$

Next, the optical systems L0 according to the individual examples can satisfy inequality (8), shown below, where yi is the distance from the optical axis to the inflection point in the radial direction on the object-side surface of the first aspherical lens, and yL1 is the maximum effective diameter. An optical system that has good optical characteristics while satisfying the projective characteristic described above can be achieved by satisfying inequality (8).

$$0.20 < |yi/yL1| < 1.00 \quad (8)$$

When the upper limit value of inequality (8) is exceeded, the position of the inflection point is too close to a peripheral portion, and accordingly, correction of various aberrations near the optical axis becomes difficult. On the other hand, when the lower limit value of inequality (8) is not reached, an inflection point needs to be provided by significantly changing the curvature with respect to the paraxial curvature at a position close to the optical axis, and accordingly, it becomes difficult to well correct various aberrations.

It should be noted that, in some embodiments, the numerical range of inequality (8) is more preferably the numerical range of inequality (8a) shown below. In addition, in some embodiments, the numerical range of inequality (8a) is even more preferably the numerical range of inequality (8b) shown below.

$$0.25 < |yi/yL1| < 0.90 \quad (8a)$$

$$0.30 < |yi/yL1| < 0.80 \quad (8b)$$

In the optical systems L0 according to the individual examples, the lens disposed closest to the image can be an aspherical lens. In the structure described above, the field curvature can be effectively corrected and high optical performance can be acquired.

Next, the detailed structures of the optical systems L0 according to the individual examples will be described.

First Example

The optical system L0 according the first example includes a negative lens L11, a negative lens L12, a positive lens L13, the aperture stop SP, a positive lens L14, a negative lens L15, and a positive lens L16 that are disposed in this order from the object side to the image side. The optical system L0 according to the present example has a focal length of 9.00 mm and a half field angle of 60°.

In the present example, the first aspherical surface is the negative lens L11, the first plastic lens is the negative lens L12, the second plastic lens is the positive lens L14, and the third plastic lens is the negative lens L15.

Second Example

The optical system L0 according the second example includes a negative lens L21, a negative lens L22, a positive lens L23, a negative lens L24, the aperture stop SP, a positive lens L25, a negative lens L26, a positive lens L27, a cemented lens L289, and a positive lens L210 that are disposed in this order from the object side to the image side. The cemented lens L289 includes a positive lens L28 and a negative lens L29. The optical system L0 according to the present example has a focal length of 9.00 mm and a half field angle of 60°.

In the present example, the first aspherical surface is the negative lens L21, the first plastic lens is the negative lens L24, the second plastic lens is the positive lens L25, and the third plastic lens is the negative lens L26.

In the present example, the negative lens L22 is disposed adjacent to the image side of the negative lens L21. In the structure described above, the negative refractive power of the negative lens L21 can be distributed and the angular aperture of the image-side surface of the negative lens L21 can be reduced. In addition, the positive lens L23 is disposed adjacent to the image side of the negative lens L22. In the structure described above, the light flux diverged by the negative lens L21 and the negative lens L22 can be converged.

In the present example, the positive lens L27 is disposed adjacent to the object side of the negative lens L26. In the structure described above, the light flux diverged by the negative lens L26 can be converged and the incident angle on the cemented lens L289 can be suppressed. In addition, the cemented lens L289 is disposed adjacent to the image side of the positive lens L27. In the structure described above, the chromatic aberration can be corrected well.

Third Example

The optical system L0 according the third example includes a negative lens L31, a negative lens L32, a positive lens L33, a positive lens L34, the aperture stop SP, a positive lens L35, a negative lens L36, a cemented lens L378, and a positive lens L39 that are disposed in this order from the object side to the image side. The cemented lens L378 includes a positive lens L37 and a negative lens L38. The optical system L0 according to the present example has a focal length of 9.00 mm and a half field angle of 60°.

In the present example, the first aspherical surface is the negative lens L31, the first plastic lens is the negative lens L32, the second plastic lens is the positive lens L34, and the third plastic lens is the negative lens L36.

In the present example, the negative lens L32 with strong negative refractive power is disposed adjacent to the image side of the negative lens L31. In the structure described above, the angular aperture of the image-side surface of the negative lens L31 can be reduced. In addition, the positive lens L33 is disposed adjacent to the image side of the negative lens L32. In the structure described above, the light flux diverged by the negative lens L31 and the negative lens L32 can be converged.

In the present example, the positive lens L35 is disposed on the image side of the positive lens L34. In the structure described above, positive refractive power can be distributed by the aperture stop SP, and accordingly, various aberrations can be corrected well. In addition, the cemented lens L378 is disposed adjacent to the image side of the negative lens L36. In the structure described above, the chromatic aberration can be corrected well.

Fourth Example

The optical system L0 according the fourth example includes a negative lens L41, a negative lens L42, a positive lens L43, a positive lens L44, the aperture stop SP, a positive lens L45, a negative lens L46, a cemented lens L478, and a positive lens L49 that are disposed in this order from the object side to the image side. The cemented lens L478 includes a positive lens L47 and a negative lens L48. The optical system L0 according to the present example has a focal length of 9.00 mm and a half field angle of 60°.

In the present example, the first aspherical surface is the negative lens L41, the first plastic lens is the negative lens L42, the second plastic lens is the positive lens L44, and the third plastic lens is the negative lens L46.

In the present example, the positive lens LA3 is disposed adjacent to the image side of the negative lens LA2.

In the structure described above, the light flux diverged by the negative lens L41 and the negative lens L42 can be converged. In addition, the positive lens L45 is disposed on the image side of the positive lens LA4. In the structure described above, positive refractive power can be distributed by the aperture stop SP, and accordingly, various aberrations can be corrected well. Furthermore, the cemented lens L478 is disposed adjacent to the image side of the negative lens L46. In the structure described above, the chromatic aberration can be corrected well.

Fifth Example

The optical system L0 according the fifth example includes a negative lens L51, a negative lens L52, a negative lens L53, a positive lens L54, the aperture stop SP, a positive lens L55, a positive lens L56, a negative lens L57, a cemented lens L589, and a positive lens L510 that are disposed in this order from the object side to the image side. The cemented lens L589 includes a positive lens L58 and a negative lens L59. The optical system L0 according to the present example has a focal length of 9.00 mm and a half field angle of 60°.

In the present example, the first aspherical surface is the negative lens L51, the first plastic lens is the negative lens L53, the second plastic lens is the positive lens L55, and the third plastic lens is the negative lens L57.

In the present example, the positive lens L56 is disposed on the image side of the positive lens L55. In the structure described above, positive refractive power can be distributed by the aperture stop SP, and accordingly, various aberrations can be corrected well. In addition, the cemented lens L589 is disposed adjacent to the image side of the negative lens L57. In the structure described above, the chromatic aberration can be corrected well.

The following will illustrate first to fifth numerical examples corresponding to the first to fifth examples.

In the surface data of each of the individual numerical examples, r is the curvature radius of the optical surface, and d (mm) is the axial distance (distance on the optical axis) between the m-th surface and the (m+1)-th surface. In addition, m is the ordinal number of a surface counted from the light incident side. In addition, nd is the refractive index of each of the optical members with respect to the d-line, and vd is the Abbe number of each of the optical members. It should be noted that the Abbe number vd of a certain material is defined by the following equation, where the refractive indexes with respect to the d-line (587.6 nm), F-line (486.1 nm), C-line (656.3 nm), and g-line (wavelength 435.8 nm) of the Fraunhofer lines are Nd, NF, NC, and Ng, respectively.

$$vd=(Nd-1)/(NF-NC)$$

It should be noted that, in the numerical examples, the focal length (mm), the F-number, and the half field angle) (° are values assumed when the zoom lenses according to the individual examples are focused on an infinite object. A back focus BF is the distance from the final lens surface to the image plane. The total optical length is a value acquired by adding the back focus to the distance from the first lens surface to the final lens surface. The lens group may include not only a plurality of lenses but may also include one lens.

In addition when the optical surface is aspherical, an asterisk (*) is added to the right of the surface number. In an aspherical shape, z is the sagittal amount (mm) of the aspherical shape in the direction of the optical axis, c is the curvature (1/mm) on the optical axis AX, and h is the height from the optical axis in a direction orthogonal to the optical axis. In addition, the sagittal amount can be represented by the following equation, where R is a paraxial curvature radius, K is a conic constant, and A, B, C, and D are the aspherical coefficients of the individual degrees, respectively. It should be noted that the "e±XX" in each of the aspherical coefficients means "×10±XX".

$$z=(h^2/R)/\left[1+\{1-(1+K)(h/R)^2\}^{1/2}\right]+A\times h^4+B\times h^6+C\times h^8+D\times h^{10}$$

It should be noted that, in the aspherical surface equation, the first term indicates the sagittal amount of a base spherical surface, and the curvature radius of this base spherical surface is R (=1/c). In addition, the second and subsequent terms indicate the sagittal amounts of aspherical components applied onto the base spherical surface.

In the first to fifth numerical examples, the values described above at 25° C. and 85° C. are illustrated. For 25° C. dni/dT (unit: $\times 10^{-6}$/° C.) is illustrated as the temperature coefficient of the refractive index with respect to the d-line of the i-th optical member at 20° C. to 40° C.

First value example
Unit (mm)

Surface data (25° C.)

| Surface number | r | d | nd | νd | dn/dT |
|---|---|---|---|---|---|
| 1* | 9.013 | 4.236 | 1.808 | 40.5 | 8.5 |
| 2* | 4.388 | 2.510 | | | |
| 3* | 224.749 | 2.382 | 1.537 | 56.0 | −97.0 |
| 4* | 13.408 | 2.884 | | | |
| 5 | 26.967 | 4.493 | 1.804 | 46.6 | 4.7 |
| 6 | −15.477 | 3.874 | | | |
| 7 | ∞ | 3.558 | | | |
| 8* | 10.406 | 2.919 | 1.537 | 56.0 | −97.0 |
| 9* | −7.883 | 0.200 | | | |
| 10* | −13.017 | 3.494 | 1.639 | 23.2 | −106.0 |
| 11* | 9.280 | 1.301 | | | |
| 12* | 10.046 | 4.489 | 1.589 | 61.2 | 4.6 |
| 13* | −19.610 | 3.438 | | | |
| 14 | ∞ | 0.580 | 1.517 | 64.2 | 2.7 |
| 15 | ∞ | 0.150 | | | |
| 16 | ∞ | 0.500 | 1.517 | 64.2 | 2.7 |
| 17 | ∞ | 0.540 | | | |
| Image plane | ∞ | — | — | — | — |

Aspherical data (25° C.)

| Surface number | K | A | B | C | D | E | F |
|---|---|---|---|---|---|---|---|
| 1 | −7.978.E+00 | 4.561.E−04 | −5.000.E−05 | 1.000.E−06 | −1.290.E−08 | 5.475.E−11 | 0.000.E+00 |
| 2 | −5.371.E−01 | −2.778.E−03 | −2.100.E−05 | 3.000.E−06 | −7.101.E−08 | 4.948.E−10 | 0.000.E+00 |
| 3 | 0.000.E+00 | −6.283.E−04 | 6.000.E−06 | 0.000.E+00 | 0.000.E+00 | 0.000.E+00 | 0.000.E+00 |
| 4 | 0.000.E+00 | −3.363.E−04 | 4.000.E−06 | 0.000.E+00 | 0.000.E+00 | 0.000.E+00 | 0.000.E+00 |
| 8 | 0.000.E+00 | 6.300.E−05 | 1.000.E−06 | 0.000.E+00 | 0.000.E+00 | 0.000.E+00 | 0.000.E+00 |
| 9 | 0.000.E+00 | 6.774.E−04 | −1.000.E−06 | 0.000.E+00 | 0.000.E+00 | 0.000.E+00 | 0.000.E+00 |
| 10 | 0.000.E+00 | −6.715.E−04 | 1.000.E−05 | 0.000.E+00 | 0.000.E+00 | 0.000.E+00 | 0.000.E+00 |
| 11 | 0.000.E+00 | −8.695.E−04 | 9.000.E−06 | 0.000.E+00 | 0.000.E+00 | 0.000.E+00 | 0.000.E+00 |
| 12 | 0.000.E+00 | −2.485.E−04 | 4.000.E−06 | −1.885.E−07 | 4.251.E−09 | 0.000.E+00 | 0.000.E+00 |
| 13 | −2.949.E+00 | −1.452.E−03 | 6.700.E−05 | −2.000.E−06 | 2.255.E−08 | −6.247.E−11 | 0.000.E+00 |

Surface data (85° C.)

| Surface number | r | d | nd | νd |
|---|---|---|---|---|
| 1* | 9.017 | 4.238 | 1.809 | 40.4 |
| 2* | 4.390 | 2.505 | | |
| 3* | 225.586 | 2.391 | 1.531 | 55.9 |
| 4* | 13.458 | 2.896 | | |
| 5 | 26.978 | 4.494 | 1.805 | 46.4 |
| 6 | −15.484 | 3.879 | | |
| 7 | ∞ | 3.555 | | |
| 8* | 10.445 | 2.930 | 1.531 | 55.9 |
| 9* | −7.913 | 0.189 | | |
| 10* | −13.075 | 3.510 | 1.633 | 23.2 |
| 11* | 9.321 | 1.310 | | |
| 12* | 10.051 | 4.491 | 1.590 | 60.9 |
| 13* | −19.619 | 3.443 | | |
| 14 | ∞ | 0.580 | 1.517 | 63.9 |

-continued

| First value example Unit (mm) | | | | |
|---|---|---|---|---|
| 15 | ∞ | 0.151 | | |
| 16 | ∞ | 0.500 | 1.517 | 63.9 |
| 17 | ∞ | 0.541 | | |
| Image plane | ∞ | — | — | — |

Aspherical data (85° C.)

| Surface number | K | A | B | C | D | E | F |
|---|---|---|---|---|---|---|---|
| 1 | −7.98.E+00 | 4.56.E−04 | −5.00.E−05 | 1.00.E−06 | −1.28.E−08 | 5.45.E−11 | 0.00.E+00 |
| 2 | −5.37.E−01 | −2.77.E−03 | −2.10.E−05 | 3.00.E−06 | −7.07.E−08 | 4.93.E−10 | 0.00.E+00 |
| 3 | 0.00.E+00 | −6.21.E−04 | 6.00.E−06 | 0.00.E+00 | 0.00.E+00 | 0.00.E+00 | 0.00.E+00 |
| 4 | 0.00.E+00 | −3.33.E−04 | 4.00.E−06 | 0.00.E+00 | 0.00.E+00 | 0.00.E+00 | 0.00.E+00 |
| 8 | 0.00.E+00 | 6.20.E−05 | 1.00.E−06 | 0.00.E+00 | 0.00.E+00 | 0.00.E+00 | 0.00.E+00 |
| 9 | 0.00.E+00 | 6.70.E−04 | −1.00.E−06 | 0.00.E+00 | 0.00.E+00 | 0.00.E+00 | 0.00.E+00 |
| 10 | 0.00.E+00 | −6.63.E−04 | 1.00.E−05 | 0.00.E+00 | 0.00.E+00 | 0.00.E+00 | 0.00.E+00 |
| 11 | 0.00.E+00 | −8.58.E−04 | 9.00.E−06 | 0.00.E+00 | 0.00.E+00 | 0.00.E+00 | 0.00.E+00 |
| 12 | 0.00.E+00 | −2.48.E−04 | 4.00.E−06 | −1.88.E−07 | 4.23.E−09 | 0.00.E+00 | 0.00.E+00 |
| 13 | −2.95.E+00 | −1.45.E−03 | 6.70.E−05 | −2.00.E−06 | 2.25.E−08 | −6.22.E−11 | 0.00.E+00 |

Second value example
Unit (mm)

Surface data (25° C.)

| Surface number | r | d | nd | νd | dn/dT |
|---|---|---|---|---|---|
| 1* | 9.000 | 3.957 | 1.537 | 56.0 | −97 |
| 2* | 3.971 | 2.339 | | | |
| 3 | 76.561 | 2.066 | 1.905 | 35.0 | 5.5 |
| 4 | 11.816 | 1.321 | | | |
| 5 | 65.274 | 2.373 | 1.717 | 47.9 | −0.2 |
| 6 | −11.386 | 0.272 | | | |
| 7* | −12.365 | 2.336 | 1.537 | 56.0 | −97 |
| 8* | −18.596 | 0.424 | | | |
| 9 | ∞ | 0.164 | | | |
| 10* | 13.870 | 2.484 | 1.537 | 56.0 | −97 |
| 11* | −172.983 | 2.334 | | | |
| 12* | 18.044 | 1.100 | 1.537 | 56.0 | −97 |
| 13* | 13.032 | 0.415 | | | |
| 14 | 13.964 | 2.375 | 1.538 | 74.7 | −4.3 |
| 15 | −11.083 | 0.603 | | | |
| 16 | 62.775 | 4.533 | 1.595 | 67.7 | −6 |
| 17 | −7.660 | 2.312 | 1.762 | 26.5 | 2 |
| 18 | 26.055 | 0.200 | | | |
| 19* | 17.957 | 3.962 | 1.537 | 56.0 | −97 |
| 20* | 51.930 | 1.783 | | | |
| 21 | ∞ | 0.580 | 1.517 | 64.2 | 2.7 |
| 22 | ∞ | 0.150 | | | |
| 23 | ∞ | 0.500 | 1.517 | 64.2 | 2.7 |
| 24 | ∞ | 0.540 | | | |
| Image plane | ∞ | — | — | — | — |

Aspherical data (25° C.)

| Surface number | K | A | B | C | D | E | F |
|---|---|---|---|---|---|---|---|
| 1 | −9.29.E+00 | 3.62.E−04 | −7.70.E−05 | 3.00.E−06 | −4.72.E−08 | 4.23.E−10 | −1.56.E−12 |
| 2 | −5.11.E−01 | −2.61.E−03 | −3.60.E−05 | 4.00.E−06 | 7.89.E−08 | −1.05.E−08 | 2.52.E−10 |
| 7 | 0.00.E+00 | 3.38.E−04 | 1.10.E−05 | 0.00.E+00 | 0.00.E+00 | 0.00.E+00 | 0.00.E+00 |
| 8 | 0.00.E+00 | 2.84.E−04 | −2.10.E−05 | 0.00.E+00 | 0.00.E+00 | 0.00.E+00 | 0.00.E+00 |
| 10 | −8.51.E−01 | 2.78.E−04 | −1.80.E−05 | 8.66.E−08 | −1.87.E−08 | 0.00.E+00 | 0.00.E+00 |
| 11 | 0.00.E+00 | −9.40.E−05 | 1.90.E−05 | −1.00.E−06 | 0.00.E+00 | 0.00.E+00 | 0.00.E+00 |
| 12 | 0.00.E+00 | 1.10.E−05 | −3.00.E−06 | 0.00.E+00 | 0.00.E+00 | 0.00.E+00 | 0.00.E+00 |
| 13 | 0.00.E+00 | 5.54.E−04 | −9.00.E−06 | 0.00.E+00 | 0.00.E+00 | 0.00.E+00 | 0.00.E+00 |
| 19 | −1.00.E+01 | −2.00.E−05 | 5.60.E−05 | −4.00.E−06 | 1.55.E−07 | −3.23.E−09 | 2.75.E−11 |
| 20 | 1.00.E+01 | −4.46.E−03 | 2.52.E−04 | −1.10.E−05 | 3.22.E−07 | −5.66.E−09 | 4.35.E−11 |

-continued

Second value example
Unit (mm)

Surface data (85° C.)

| Surface number | r | d | nd | νd |
|---|---|---|---|---|
| 1* | 9.034 | 3.972 | 1.531 | 55.9 |
| 2* | 3.986 | 2.350 | | |
| 3 | 76.596 | 2.067 | 1.906 | 34.9 |
| 4 | 11.822 | 1.326 | | |
| 5 | 65.308 | 2.375 | 1.717 | 47.7 |
| 6 | −11.392 | 0.258 | | |
| 7* | −12.411 | 2.345 | 1.531 | 55.9 |
| 8* | −18.665 | 0.433 | | |
| 9 | ∞ | 0.159 | | |
| 10* | 13.922 | 2.493 | 1.531 | 55.9 |
| 11* | −173.627 | 2.332 | | |
| 12* | 18.111 | 1.104 | 1.531 | 55.9 |
| 13* | 13.081 | 0.420 | | |
| 14 | 13.975 | 2.377 | 1.538 | 74.4 |
| 15 | −11.091 | 0.609 | | |
| 16 | 62.838 | 4.537 | 1.595 | 67.5 |
| 17 | −7.665 | 2.313 | 1.762 | 26.4 |
| 18 | 26.064 | 0.192 | | |
| 19* | 18.024 | 3.976 | 1.531 | 55.9 |
| 20* | 52.123 | 1.784 | | |
| 21 | ∞ | 0.580 | 1.517 | 63.9 |
| 22 | ∞ | 0.151 | | |
| 23 | ∞ | 0.500 | 1.517 | 63.9 |
| 24 | ∞ | 0.541 | | |
| Image plane | ∞ | — | — | — |

Aspherical data (85° C.)

| Surface number | K | A | B | C | D | E | F |
|---|---|---|---|---|---|---|---|
| 1 | −9.29.E+00 | 3.58.E−04 | −7.60.E−05 | 3.00.E−06 | −4.56.E−08 | 4.06.E−10 | −1.49.E−12 |
| 2 | −5.11.E−01 | −2.58.E−03 | −3.50.E−05 | 4.00.E−06 | 7.63.E−08 | −1.01.E−08 | 2.40.E−10 |
| 7 | 0.00.E+00 | 3.34.E−04 | 1.10.E−05 | 0.00.E+00 | 0.00.E+00 | 0.00.E+00 | 0.00.E+00 |
| 8 | 0.00.E+00 | 2.81.E−04 | −2.00.E−05 | 0.00.E+00 | 0.00.E+00 | 0.00.E+00 | 0.00.E+00 |
| 10 | −8.51.E−01 | 2.75.E−04 | −1.80.E−05 | 8.44.E−08 | −1.81.E−08 | 0.00.E+00 | 0.00.E+00 |
| 11 | 0.00.E+00 | −9.30.E−05 | 1.80.E−05 | −1.00.E−06 | 0.00.E+00 | 0.00.E+00 | 0.00.E+00 |
| 12 | 0.00.E+00 | 1.10.E−05 | −3.00.E−06 | 0.00.E+00 | 0.00.E+00 | 0.00.E+00 | 0.00.E+00 |
| 13 | 0.00.E+00 | 5.48.E−04 | −9.00.E−06 | 0.00.E+00 | 0.00.E+00 | 0.00.E+00 | 0.00.E+00 |
| 19 | −1.00.E+01 | −2.00.E−05 | 5.50.E−05 | −4.00.E−06 | 1.50.E−07 | −3.10.E−09 | 2.62.E−11 |
| 20 | 1.00.E+01 | −4.41.E−03 | 2.48.E−04 | −1.00.E−05 | 3.12.E−07 | −5.43.E−09 | 4.14.E−11 |

Third value example
Unit (mm)

Surface data (25° C.)

| Surface number | r | d | nd | νd | dn/dT |
|---|---|---|---|---|---|
| 1* | 9.329 | 3.528 | 1.689 | 31.0 | 2.6 |
| 2* | 6.892 | 0.956 | | | |
| 3* | 19.754 | 2.204 | 1.639 | 23.2 | −106.0 |
| 4* | 7.769 | 2.107 | | | |
| 5 | 9.319 | 4.461 | 1.788 | 47.4 | 4.4 |
| 6 | −9.577 | 4.080 | | | |
| 7 | ∞ | 0.200 | | | |
| 8* | 8.656 | 1.411 | 1.537 | 56.0 | −97.0 |
| 9* | −74.186 | 2.078 | | | |
| 10 | 14.931 | 2.200 | 1.528 | 76.5 | −5.9 |
| 11 | −9.464 | 0.203 | | | |
| 12* | −11.375 | 1.296 | 1.537 | 56.0 | −97.0 |
| 13* | 8.543 | 0.553 | | | |
| 14 | 8.439 | 3.758 | 1.595 | 67.7 | −6.0 |
| 15 | −6.746 | 1.000 | 1.762 | 26.5 | 2.0 |
| 16 | 11.981 | 0.200 | | | |
| 17* | 11.562 | 2.978 | 1.693 | 52.9 | 7.7 |
| 18* | −89.370 | 1.200 | | | |
| 19 | ∞ | 0.580 | 1.517 | 64.2 | 2.7 |
| 20 | ∞ | 0.150 | | | |
| 21 | ∞ | 0.500 | 1.517 | 64.2 | 2.7 |

-continued

Third value example
Unit (mm)

| | | | | | |
|---|---|---|---|---|---|
| 22 | ∞ | 0.540 | | | |
| Image plane | ∞ | — | — | — | — |

Aspherical data (25° C.)

| Surface number | K | A | B | C | D | E | F |
|---|---|---|---|---|---|---|---|
| 1 | −7.28.E+00 | 3.01.E−04 | −4.20.E−05 | 1.00.E−06 | −1.11.E−08 | 4.55.E−11 | 0.00.E+00 |
| 2 | −2.53.E−01 | −1.76.E−03 | −7.00.E−06 | 1.00.E−06 | −2.97.E−08 | 2.52.E−10 | 0.00.E+00 |
| 3 | 0.00.E+00 | 5.54.E−04 | −2.50.E−05 | 0.00.E+00 | 0.00.E+00 | 0.00.E+00 | 0.00.E+00 |
| 4 | 0.00.E+00 | 8.30.E−04 | −4.80.E−05 | 0.00.E+00 | 0.00.E+00 | 0.00.E+00 | 0.00.E+00 |
| 8 | 0.00.E+00 | −1.80.E−04 | 3.00.E−06 | 0.00.E+00 | 0.00.E+00 | 0.00.E+00 | 0.00.E+00 |
| 9 | 0.00.E+00 | −1.33.E−04 | 7.00.E−06 | 0.00.E+00 | 0.00.E+00 | 0.00.E+00 | 0.00.E+00 |
| 12 | 0.00.E+00 | −4.57.E−04 | 1.00.E−06 | 0.00.E+00 | 0.00.E+00 | 0.00.E+00 | 0.00.E+00 |
| 13 | 0.00.E+00 | 3.03.E−04 | 2.00.E−06 | 0.00.E+00 | 0.00.E+00 | 0.00.E+00 | 0.00.E+00 |
| 17 | 0.00.E+00 | −1.34.E−04 | 3.70.E−05 | −2.00.E−06 | 7.62.E−08 | −9.25.E−10 | 0.00.E+00 |
| 18 | 0.00.E+00 | −3.85.E−03 | 2.42.E−04 | −9.00.E−06 | 2.16.E−07 | −2.15.E−09 | 0.00.E+00 |

Surface data (85° C.)

| Surface number | r | d | nd | νd |
|---|---|---|---|---|
| 1* | 9.336 | 3.531 | 1.690 | 30.9 |
| 2* | 6.897 | 0.945 | | |
| 3* | 19.842 | 2.214 | 1.633 | 23.2 |
| 4* | 7.804 | 2.120 | | |
| 5 | −9.323 | 4.463 | 1.789 | 47.2 |
| 6 | −9.581 | 4.084 | | |
| 7 | ∞ | 0.197 | | |
| 8* | 8.688 | 1.417 | 1.531 | 55.9 |
| 9* | −74.462 | 2.083 | | |
| 10 | 14.942 | 2.202 | 1.528 | 76.1 |
| 11 | −9.472 | 0.197 | | |
| 12* | −11.417 | 1.301 | 1.531 | 55.9 |
| 13* | 8.575 | 0.560 | | |
| 14 | 8.446 | 3.761 | 1.595 | 67.5 |
| 15 | −6.751 | 1.001 | 1.762 | 26.4 |
| 16 | 11.985 | 0.204 | | |
| 17* | 11.566 | 2.979 | 1.694 | 52.7 |
| 18* | −89.403 | 1.201 | | |
| 19 | ∞ | 0.580 | 1.517 | 63.9 |
| 20 | ∞ | 0.151 | | |
| 21 | ∞ | 0.500 | 1.517 | 63.9 |
| 22 | ∞ | 0.541 | | |
| Image plane | ∞ | — | — | — |

Aspherical data (85° C.)

| Surface number | K | A | B | C | D | E | F |
|---|---|---|---|---|---|---|---|
| 1 | −7.28.E+00 | 3.01.E−04 | −4.20.E−05 | 1.00.E−06 | −1.10.E−08 | 4.52.E−11 | 0.00.E+00 |
| 2 | −2.53.E−01 | −1.75.E−03 | −7.00.E−06 | 1.00.E−06 | −2.95.E−08 | 2.50.E−10 | 0.00.E+00 |
| 3 | 0.00.E+00 | 5.46.E−04 | −2.40.E−05 | 0.00.E+00 | 0.00.E+00 | 0.00.E+00 | 0.00.E+00 |
| 4 | 0.00.E+00 | 8.20.E−04 | −4.70.E−05 | 0.00.E+00 | 0.00.E+00 | 0.00.E+00 | 0.00.E+00 |
| 8 | 0.00.E+00 | −1.78.E−04 | 3.00.E−06 | 0.00.E+00 | 0.00.E+00 | 0.00.E+00 | 0.00.E+00 |
| 9 | 0.00.E+00 | −1.31.E−04 | 7.00.E−06 | 0.00.E+00 | 0.00.E+00 | 0.00.E+00 | 0.00.E+00 |
| 12 | 0.00.E+00 | −4.52.E−04 | 1.00.E−06 | 0.00.E+00 | 0.00.E+00 | 0.00.E+00 | 0.00.E+00 |
| 13 | 0.00.E+00 | 3.00.E−04 | 2.00.E−06 | 0.00.E+00 | 0.00.E+00 | 0.00.E+00 | 0.00.E+00 |
| 17 | 0.00.E+00 | −1.34.E−04 | 3.70.E−05 | −2.00.E−06 | 7.59.E−08 | −9.22.E−10 | 0.00.E+00 |
| 18 | 0.00.E+00 | −3.85.E−03 | 2.41.E−04 | −9.00.E−06 | 2.16.E−07 | −2.14.E−09 | 0.00.E+00 |

Fourth value example
Unit (mm)

Surface data (25° C.)

| Surface number | r | d | nd | νd | dn/dT |
|---|---|---|---|---|---|
| 1* | 9.346 | 4.209 | 1.731 | 40.5 | 4.2 |
| 2* | 4.861 | 1.746 | | | |
| 3* | −1402.316 | 1.161 | 1.537 | 56.0 | −97.0 |
| 4* | 12.245 | 1.525 | | | |
| 5 | −9.699 | 4.242 | 1.816 | 46.6 | 5.2 |

-continued

| Fourth value example<br>Unit (mm) | | | | | |
|---|---|---|---|---|---|
| 6 | −11.228 | 0.400 | | | |
| 7* | 9.632 | 1.948 | 1.537 | 56.0 | −97.0 |
| 8* | 111.319 | 4.569 | | | |
| 9 | ∞ | 0.200 | | | |
| 10 | 14.138 | 3.250 | 1.595 | 67.7 | −6.0 |
| 11 | −12.512 | 0.200 | | | |
| 12* | −15.633 | 1.540 | 1.537 | 56.0 | −97.0 |
| 13* | 33.321 | 0.200 | | | |
| 14 | 13.182 | 3.879 | 1.603 | 65.4 | −2.5 |
| 15 | −7.598 | 2.779 | 1.762 | 26.5 | 2.0 |
| 16 | 30.200 | 1.236 | | | |
| 17* | 13.783 | 4.500 | 1.589 | 61.2 | 4.6 |
| 18* | −116.364 | 1.203 | | | |
| 19 | ∞ | 0.580 | 1.517 | 64.2 | 2.7 |
| 20 | ∞ | 0.150 | | | |
| 21 | ∞ | 0.500 | 1.517 | 64.2 | 2.7 |
| 22 | ∞ | 0.540 | | | |
| Image plane | ∞ | — | — | — | — |

Aspherical data (25° C.)

| Surface number | K | A | B | C | D | E | F |
|---|---|---|---|---|---|---|---|
| 1 | −6.31.E+00 | 2.28.E−04 | −3.50.E−05 | 1.00.E−06 | −7.35.E−09 | 2.71.E−11 | 0.00.E+00 |
| 2 | −3.52.E−01 | −1.92.E−03 | −4.70.E−05 | 5.00.E−06 | −2.24.E−07 | 4.12.E−09 | 0.00.E+00 |
| 3 | 0.00.E+00 | 7.71.E−04 | −3.30.E−05 | 0.00.E+00 | 0.00.E+00 | 0.00.E+00 | 0.00.E+00 |
| 4 | 0.00.E+00 | 4.19.E−04 | −5.00.E−05 | 0.00.E+00 | 0.00.E+00 | 0.00.E+00 | 0.00.E+00 |
| 7 | 0.00.E+00 | −1.49.E−04 | 1.00.E−06 | 0.00.E+00 | 0.00.E+00 | 0.00.E+00 | 0.00.E+00 |
| 8 | 0.00.E+00 | −4.90.E−05 | 3.00.E−06 | 0.00.E+00 | 0.00.E+00 | 0.00.E+00 | 0.00.E+00 |
| 12 | 0.00.E+00 | −1.54.E−04 | 1.00.E−06 | 0.00.E+00 | 0.00.E+00 | 0.00.E+00 | 0.00.E+00 |
| 13 | 0.00.E+00 | 1.84.E−04 | 4.00.E−06 | 0.00.E+00 | 0.00.E+00 | 0.00.E+00 | 0.00.E+00 |
| 17 | 0.00.E+00 | 6.00.E−06 | 1.20.E−05 | −1.00.E−06 | 1.48.E−08 | −1.14.E−10 | 0.00.E+00 |
| 18 | 0.00.E+00 | −3.59.E−03 | 1.92.E−04 | −6.00.E−06 | 1.06.E−07 | −7.51.E−10 | 0.00.E+00 |

Surface data (85° C.)

| Surface number | r | d | nd | νd |
|---|---|---|---|---|
| 1* | 9.351 | 4.211 | 1.731 | 40.3 |
| 2* | 4.864 | 1.743 | | |
| 3* | −1407.538 | 1.165 | 1.531 | 55.9 |
| 4* | 12.291 | 1.534 | | |
| 5 | −9.703 | 4.244 | 1.817 | 46.4 |
| 6 | −11.233 | 0.394 | | |
| 7* | 9.668 | 1.956 | 1.531 | 55.9 |
| 8* | 111.734 | 4.576 | | |
| 9 | ∞ | 0.203 | | |
| 10 | 14.149 | 3.253 | 1.595 | 67.5 |
| 11 | −12.521 | 0.195 | | |
| 12* | −15.691 | 1.545 | 1.531 | 55.9 |
| 13* | 33.445 | 0.207 | | |
| 14 | 13.191 | 3.881 | 1.603 | 65.2 |
| 15 | −7.603 | 2.781 | 1.762 | 26.4 |
| 16 | 30.215 | 1.243 | | |
| 17* | 13.789 | 4.502 | 1.590 | 60.9 |
| 18* | −116.414 | 1.205 | | |
| 19 | ∞ | 0.580 | 1.517 | 63.9 |
| 20 | ∞ | 0.151 | | |
| 21 | ∞ | 0.500 | 1.517 | 63.9 |
| 22 | ∞ | 0.541 | | |
| Image plane | ∞ | — | — | — |

Aspherical data (85° C.)

| Surface number | K | A | B | C | D | E | F |
|---|---|---|---|---|---|---|---|
| 1 | −6.31.E+00 | 2.29.E−04 | −3.50.E−05 | 1.00.E−06 | −7.39.E−09 | 2.72.E−11 | 0.00.E+00 |
| 2 | −3.52.E−01 | −1.92.E−03 | −4.70.E−05 | 5.00.E−06 | −2.25.E−07 | 4.15.E−09 | 0.00.E+00 |
| 3 | 0.00.E+00 | 7.79.E−04 | −3.40.E−05 | 0.00.E+00 | 0.00.E+00 | 0.00.E+00 | 0.00.E+00 |
| 4 | 0.00.E+00 | 4.23.E−04 | −5.10.E−05 | 0.00.E+00 | 0.00.E+00 | 0.00.E+00 | 0.00.E+00 |
| 7 | 0.00.E+00 | −1.50.E−04 | 1.00.E−06 | 0.00.E+00 | 0.00.E+00 | 0.00.E+00 | 0.00.E+00 |
| 8 | 0.00.E+00 | −4.90.E−05 | 3.00.E−06 | 0.00.E+00 | 0.00.E+00 | 0.00.E+00 | 0.00.E+00 |

-continued

| Fourth value example Unit (mm) | | | | | | | |
|---|---|---|---|---|---|---|---|
| 12 | 0.00.E+00 | −1.56.E−04 | 1.00.E−06 | 0.00.E+00 | 0.00.E+00 | 0.00.E+00 | 0.00.E+00 |
| 13 | 0.00.E+00 | 1.86.E−04 | 4.00.E−06 | 0.00.E+00 | 0.00.E+00 | 0.00.E+00 | 0.00.E+00 |
| 17 | 0.00.E+00 | 6.00.E−06 | 1.20.E−05 | −1.00.E−06 | 1.49.E−08 | −1.14.E−10 | 0.00.E+00 |
| 18 | 0.00.E+00 | −3.59.E−03 | 1.93.E−04 | −6.00.E−06 | 1.06.E−07 | −7.54.E−10 | 0.00.E+00 |

Fifth value example
Unit (mm)

Surface data (25° C.)

| Surface number | r | d | nd | νd | dn/dT |
|---|---|---|---|---|---|
| 1* | 9.000 | 4.300 | 1.731 | 40.5 | 4.2 |
| 2* | 4.333 | 1.261 | | | |
| 3 | 11.915 | 1.878 | 1.762 | 26.5 | 2.0 |
| 4 | 8.221 | 1.129 | | | |
| 5* | 22.228 | 3.127 | 1.639 | 23.2 | −106.0 |
| 6* | 18.206 | 0.683 | | | |
| 7 | −54.532 | 4.089 | 1.816 | 46.6 | 5.2 |
| 8 | −11.440 | 2.726 | | | |
| 9 | ∞ | 1.800 | | | |
| 10* | 10.652 | 2.618 | 1.537 | 56.0 | −97.0 |
| 11* | 17.378 | 1.227 | | | |
| 12 | 14.047 | 1.568 | 1.538 | 74.7 | −4.3 |
| 13 | −16.089 | 1.255 | | | |
| 14* | −9.654 | 2.353 | 1.537 | 56.0 | −97.0 |
| 15* | −20.068 | 0.200 | | | |
| 16 | 10.622 | 3.187 | 1.487 | 70.2 | −0.8 |
| 17 | −8.479 | 1.000 | 1.699 | 30.1 | 3.6 |
| 18 | 14.744 | 0.200 | | | |
| 19 | 8.111 | 4.073 | 1.528 | 76.5 | −5.9 |
| 20 | 71.909 | 1.429 | | | |
| 21 | ∞ | 0.580 | 1.517 | 64.2 | 2.7 |
| 22 | ∞ | 0.150 | | | |
| 23 | ∞ | 0.500 | 1.517 | 64.2 | 2.7 |
| 24 | ∞ | 0.540 | | | |
| Image plane | ∞ | — | — | — | — |

Aspherical data (25° C.)

| Surface number | K | A | B | C | D | E | F |
|---|---|---|---|---|---|---|---|
| 1 | −7.15.E+00 | 3.82.E−04 | −4.20.E−05 | 1.00.E−06 | −7.51.E−09 | 2.49.E−11 | 0.00.E+00 |
| 2 | −6.35.E−01 | −2.26.E−03 | −4.10.E−05 | 4.00.E−06 | −1.02.E−07 | 1.21.E−09 | 0.00.E+00 |
| 5 | 0.00.E+00 | −3.83.E−04 | 2.00.E−06 | −1.37.E−07 | 0.00.E+00 | 0.00.E+00 | 0.00.E+00 |
| 6 | 0.00.E+00 | −3.69.E−04 | −4.00.E−06 | −1.44.E−07 | 0.00.E+00 | 0.00.E+00 | 0.00.E+00 |
| 10 | 0.00.E+00 | −1.76.E−04 | 1.50.E−05 | −3.82.E−07 | 0.00.E+00 | 0.00.E+00 | 0.00.E+00 |
| 11 | 0.00.E+00 | −4.94.E−04 | 3.30.E−05 | −1.00.E−06 | 0.00.E+00 | 0.00.E+00 | 0.00.E+00 |
| 14 | 0.00.E+00 | −1.15.E−03 | 8.20.E−05 | −1.00.E−06 | 0.00.E+00 | 0.00.E+00 | 0.00.E+00 |
| 15 | 0.00.E+00 | −9.90.E−04 | 5.00.E−05 | −1.00.E−06 | 0.00.E+00 | 0.00.E+00 | 0.00.E+00 |

Surface data (85° C.)

| Surface number | r | d | nd | νd |
|---|---|---|---|---|
| 1* | 9.005 | 4.302 | 1.731 | 40.3 |
| 2* | 4.335 | 1.263 | | |
| 3 | 11.922 | 1.879 | 1.762 | 26.4 |
| 4 | 8.225 | 1.120 | | |
| 5* | 22.326 | 3.141 | 1.633 | 23.2 |
| 6* | 18.286 | 0.690 | | |
| 7 | −54.554 | 4.091 | 1.817 | 46.4 |
| 8 | −11.445 | 2.729 | | |
| 9 | ∞ | 1.804 | | |
| 10* | 10.692 | 2.628 | 1.531 | 55.9 |
| 11* | 17.443 | 1.222 | | |
| 12 | 14.057 | 1.569 | 1.538 | 74.4 |
| 13 | −16.101 | 1.249 | | |
| 14* | −9.690 | 2.362 | 1.531 | 55.9 |
| 15* | −20.143 | 0.206 | | |
| 16 | 10.629 | 3.188 | 1.488 | 70.0 |
| 17 | −8.484 | 1.000 | 1.700 | 30.0 |
| 18 | 14.750 | 0.203 | | |

-continued

| Fifth value example Unit (mm) | | | | |
|---|---|---|---|---|
| 19 | 8.117 | 4.076 | 1.528 | 76.1 |
| 20 | 71.966 | 1.431 | | |
| 21 | ∞ | 0.580 | 1.517 | 63.9 |
| 22 | ∞ | 0.651 | | |
| 23 | ∞ | 0.500 | 1.517 | 63.9 |
| 24 | ∞ | 0.541 | | |
| Image plane | ∞ | — | — | — |

Aspherical data (85° C.)

| Surface number | K | A | B | C | D | E | F |
|---|---|---|---|---|---|---|---|
| 1 | −7.15.E+00 | 3.81.E−04 | −4.20.E−05 | 1.00.E−06 | −7.47.E−09 | 2.48.E−11 | 0.00.E+00 |
| 2 | −6.35.E−01 | −2.26.E−03 | −4.00.E−05 | 4.00.E−06 | −1.02.E−07 | 1.20.E−09 | 0.00.E+00 |
| 5 | 0.00.E+00 | −3.78.E−04 | 2.00.E−06 | −1.33.E−07 | 0.00.E+00 | 0.00.E+00 | 0.00.E+00 |
| 6 | 0.00.E+00 | −3.64.E−04 | −4.00.E−06 | −1.39.E−07 | 0.00.E+00 | 0.00.E+00 | 0.00.E+00 |
| 10 | 0.00.E+00 | −1.74.E−04 | 1.40.E−05 | −3.72.E−07 | 0.00.E+00 | 0.00.E+00 | 0.00.E+00 |
| 11 | 0.00.E+00 | −4.89.E−04 | 3.20.E−05 | −1.00.E−06 | 0.00.E+00 | 0.00.E+00 | 0.00.E+00 |
| 14 | 0.00.E+00 | −1.13.E−03 | 8.00.E−05 | −1.00.E−06 | 0.00.E+00 | 0.00.E+00 | 0.00.E+00 |
| 15 | 0.00.E+00 | −9.79.E−04 | 4.90.E−05 | −1.00.E−06 | 0.00.E+00 | 0.00.E+00 | 0.00.E+00 |

The various values in the numerical examples are summarized in Table 1 below.

TABLE 1

Table 1

| | First example | Second example | Third example | Fourth example | Fifth example |
|---|---|---|---|---|---|
| f | 9.00 | 9.00 | 9.00 | 9.00 | 9.00 |
| fp1 | −26.68 | −79.14 | −21.58 | −22.62 | −225.85 |
| fp2 | 8.85 | 24.05 | 14.53 | 19.52 | 45.16 |
| fp3 | −7.99 | −94.73 | −8.89 | −19.62 | −37.65 |
| GnL | 20.31 | 7.74 | 18.94 | 17.50 | 19.09 |
| TL | 41.55 | 39.12 | 36.18 | 40.56 | 41.87 |
| STL | 20.38 | 15.09 | 17.34 | 19.80 | 19.19 |
| GpL | 23.94 | 15.25 | 17.54 | 15.23 | 20.99 |
| θ1 | 31.18 | 53.76 | 16.02 | 35.36 | 37.02 |
| fG1 | −17.91 | −18.27 | −93.55 | −22.95 | −18.71 |
| yi | 3.17 | 2.73 | 3.18 | 3.29 | 3.21 |
| yL1 | 7.55 | 7.38 | 7.58 | 6.99 | 7.65 |
| (1) f(1/fp1 + 1/fp2 + 1/fp3) | −0.45 | 0.17 | −0.81 | −0.40 | −0.08 |
| (2) fsin(θmax)/y(θmax) | 1.63 | 1.63 | 1.63 | 1.63 | 1.63 |
| (3) GnL/TL | 0.49 | 0.20 | 0.52 | 0.43 | 0.46 |
| (4) STL/GpL | 0.85 | 0.99 | 0.99 | 1.30 | 0.91 |
| (5) θ1/w | 0.52 | 0.90 | 0.27 | 0.59 | 0.62 |
| (6) fp2/f | 0.98 | 2.67 | 1.61 | 2.17 | 5.02 |
| (7) fG1/f | −1.99 | −2.03 | −10.39 | −2.55 | −2.08 |
| (8) yi/yL1 | 0.42 | 0.37 | 0.42 | 0.47 | 0.42 |

Image Pickup Apparatus

When each of the individual examples are used as a distance measuring optical system, an image pickup element (image pickup plane phase difference sensor) capable of distinguishing incident light fluxes from two light fluxes A and B separated from each other in the pupil of the optical system and photoelectrically converting them is disposed on the image plane of the optical system. Such an image pickup element, lenses according to the individual examples, and a processing unit described later can constitute a distance measuring device, such as an in-vehicle camera.

When the subject is located on the front focal plane of each of the lenses according to the individual examples, no positional shift occurs in an image formed by two divided light fluxes on the image plane of each of the lenses according to the individual examples. However, when the subject is located at a position other than the front focal plane of each of the lenses according to the individual examples, a positional shift occurs in the image formed by two divided light fluxes. At this time, since the positional shift in the image formed by the light fluxes corresponds to the amount of displacement from the front focal plane of the subject, the distance to the subject can be measured by acquiring the amount of the positional shift and the direction of the positional shift of the image formed by the light fluxes.

In-Vehicle Camera System

Figure 12:
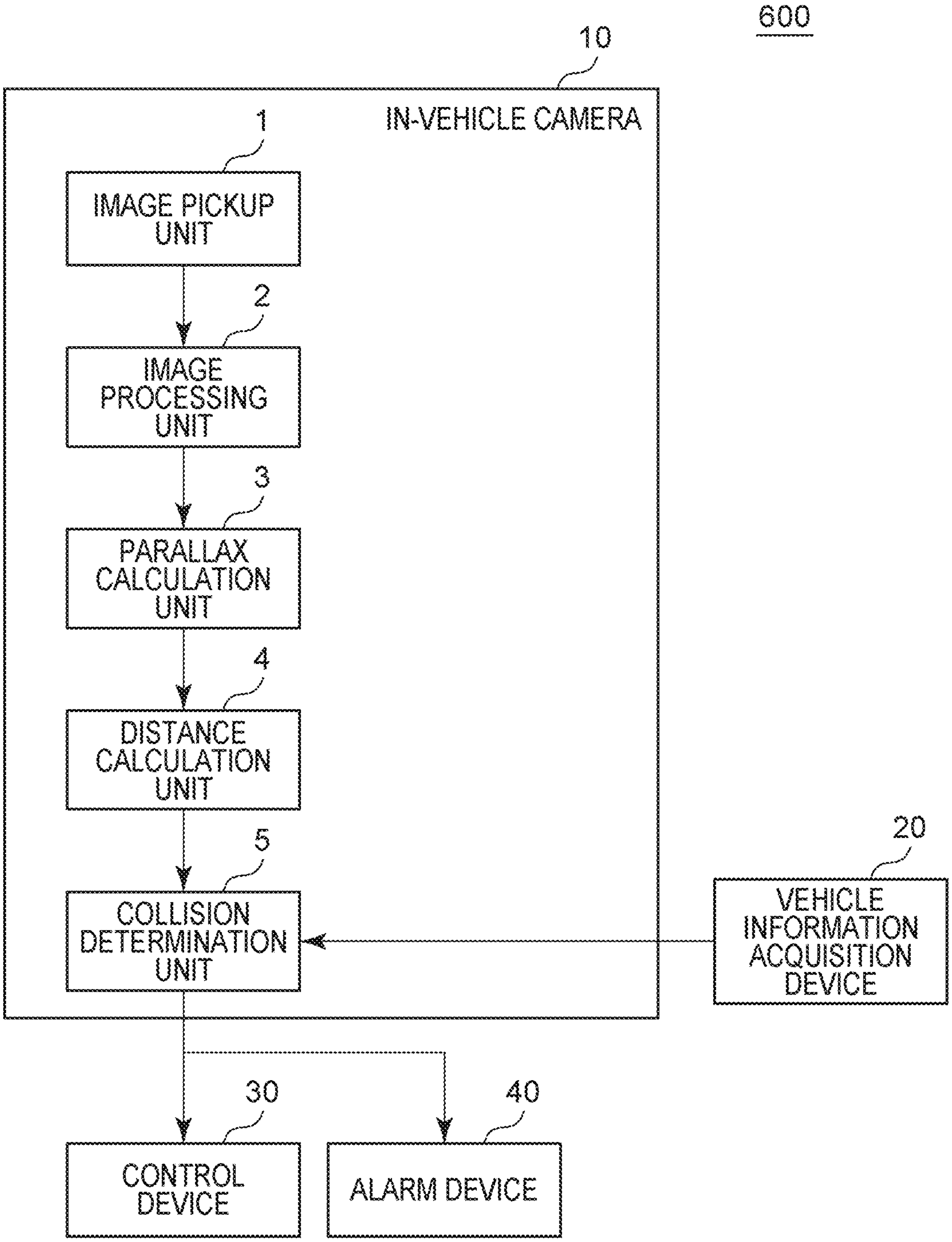
FIG. 12 is a structural diagram of an in-vehicle camera and an in-vehicle camera system including the in-vehicle camera.
Figure 13:
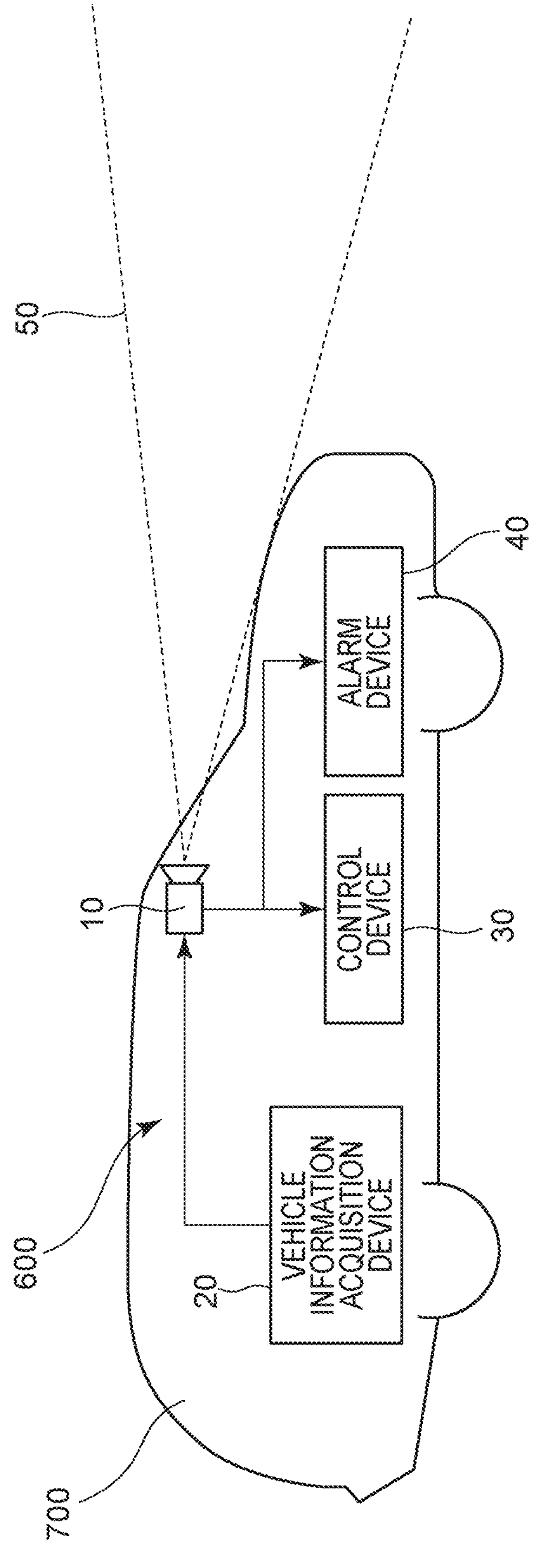
FIG. 13 is a schematic diagram of a vehicle including the in-vehicle camera system.

FIG. 12 is a structural diagram of an in-vehicle camera 10 and an in-vehicle camera system (driver assistance device) 600 including the in-vehicle camera 10. The in-vehicle camera system 600 is a device, installed in a vehicle such as an automobile, that assists the driving of the vehicle in accordance with image information around the vehicle acquired by the in-vehicle camera 10. FIG. 13 is a schematic diagram of a vehicle 700 including the in-vehicle camera system 600. FIG. 13 illustrates a case in which an image pickup range 50 of the in-vehicle camera 10 is set to a portion in front of the vehicle 700, but the image pickup range 50 may also be set to a portion behind the vehicle 700.

As illustrated in FIGS. 12 and 13, the in-vehicle camera system 600 includes the in-vehicle camera 10, a vehicle information acquisition device 20, a control device (ECU: electronic control unit) 30, and an alarm device 40. In addition, the in-vehicle camera 10 includes an image pickup unit 1, an image processing unit 2, a parallax calculation unit 3, a distance calculation unit 4, and a collision determination unit 5. The image processing unit 2, the parallax calculation unit 3, the distance calculation unit 4, and the collision determination unit 5 constitute the processing unit. The image pickup unit 1 includes the optical system according to any one of the examples described above and an image pickup plane phase difference sensor.

Figure 14:
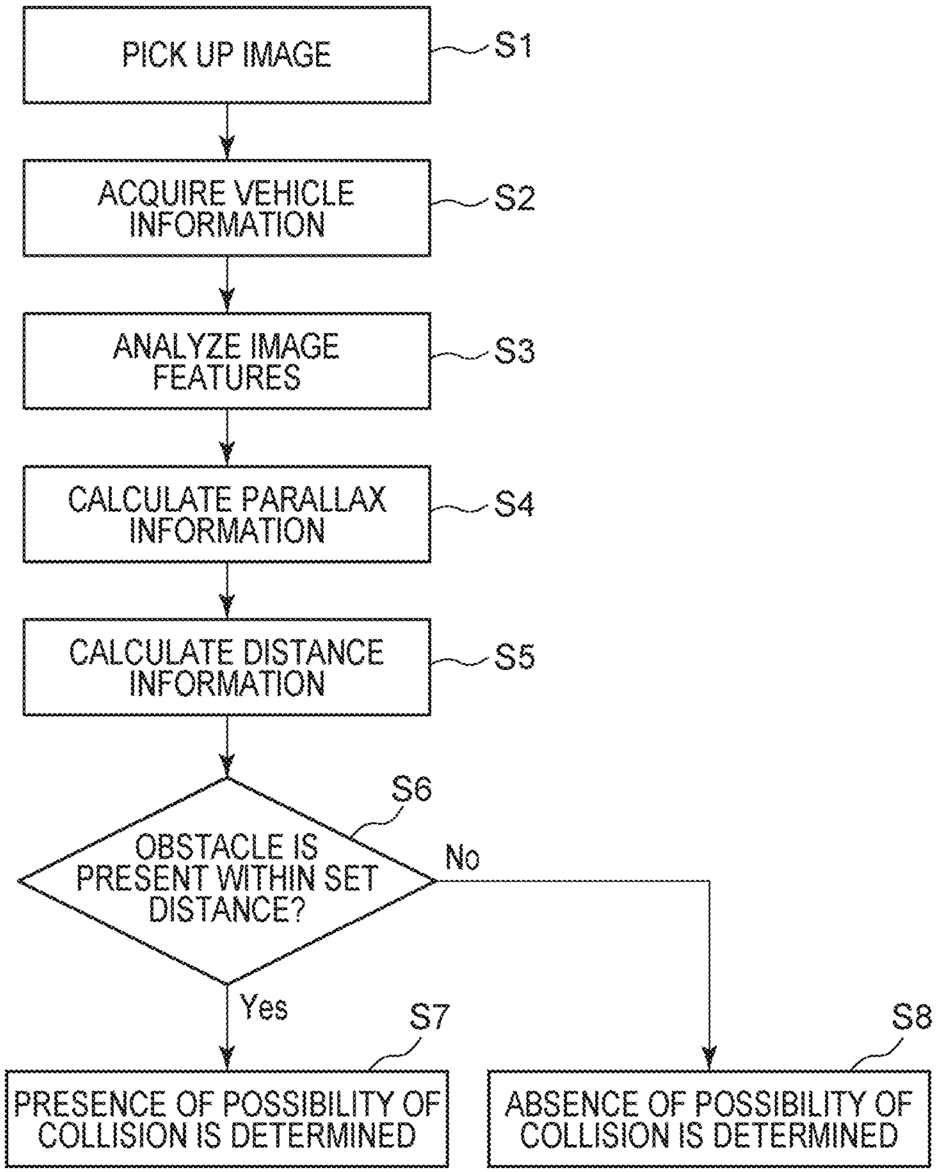
FIG. 14 is a flowchart illustrating an example of operation of the in-vehicle camera system.

FIG. 14 is a flowchart illustrating an example of operation of the in-vehicle camera system 600. The operation of the in-vehicle camera system 600 will be described below in accordance with this flowchart.

First, in step S1, the image pickup unit 1 acquires a plurality of pieces of image data (parallax image data) by imaging objects (subjects) around the vehicle.

In addition, in step S2, vehicle information is acquired through the vehicle information acquisition device 20. The vehicle information includes the speed, the yaw rate, the steering angle, and the like of the vehicle.

In step S3, the image processing unit 2 performs image processing of the plurality of pieces of image data acquired by the image pickup unit 1. Specifically, the image processing unit 2 performs image feature analysis that analyzes features values, such as the amount and the direction of edges and the density values of the image data. Here, the image feature analysis may be performed on the plurality of pieces of image data or only some of the plurality of pieces of image data.

In step S4, the parallax calculation unit 3 calculates parallax (image shift) information between the plurality of pieces of image data acquired by image pickup unit 1. The calculation method for parallax information will not be described in the present embodiment because known methods, such as the SSDA method and the area correlation method, can be used. It should be noted that step S2, step S3, and step S4 may be performed in the order described above or may be performed in parallel with each other.

In step S5, the distance calculation unit 4 calculates distance information from the object imaged by the image pickup unit 1. The distance information can be calculated in accordance with the parallax information calculated by the parallax calculation unit 3 and the internal parameters and external parameters of the image pickup unit 1. It should be noted that the distance information here refers to information about the relative position from the object, such as the distance from the object, the amount of defocusing, the amount of image shift, and may directly represent the distance value of the object in an image or may indirectly represent the information corresponding to the distance value.

Then, in step S6, the collision determination unit 5 determines whether the distance information calculated by distance calculation unit 4 falls within the range of a set distance that has been preset. As a result, the collision determination unit 5 can determine whether an obstacle is present within the set distance around the vehicle and determine the possibility of collision between the vehicle and the obstacle. The collision determination unit 5 determines the possibility of collision when an obstacle is present within the set distance (step S7) or determines no possibility of collision when an obstacle is not present within the set distance (step S8).

Next, when the collision determination unit 5 determines the possibility of collision (step S7), the collision determination unit 5 notifies the control device 30 and the alarm device 40 of the determination result. At this time, the control device 30 controls the drive unit of the vehicle in accordance with the determination result made by the collision determination unit 5, and the alarm device 40 issues an alarm in accordance with the determination result made by the collision determination unit 5.

For example, the control device 30 controls the vehicle, such as suppressing the output of the engine and the motor output, generating control signals that apply a brake, returning the accelerator pedal, and generating braking forces on wheels. In addition, the alarm device 40 issues a warning to the user (driver) of the vehicle, such as sounding an alarm, displaying alarm information on the screen of a car navigation system or the like, and vibrating the seat belt or steering.

As described above, the in-vehicle camera system 600 according to the present embodiment can effectively detect obstacles and avoid collisions with obstacles by performing the processing described above. In particular, it is possible to detect obstacles and determine collision with obstacles over a wide field angle while reducing the entire size of the in-vehicle camera 10 to increase the location flexibility by applying the optical systems according to the individual examples to the in-vehicle camera system 600.

The in-vehicle camera 10 includes only one image pickup unit 1 with an image pickup plane phase difference sensor in the present embodiment, but some embodiments are not limited to this structure, and the in-vehicle camera 10 may be a stereo camera including two image pickup units. In this case, even without using the image pickup plane phase difference sensor, the same processing as the above can be performed by simultaneously acquiring two pieces of image data by the two synchronized image pickup units and using the two pieces of image data. However, when the difference in the image pickup time between the two image pickup units is already known, the two image pickup units need not be synchronized.

In addition, various embodiments for calculating distance information can be considered. The following will describe, as an example, a case in which a pupil division image pickup element including a plurality of pixel units arranged in a two-dimensional array is adopted as the image pickup element of the image pickup unit 1. In the pupil division image pickup element, one pixel unit includes a micro lens and a plurality of photoelectric conversion units and can receive a pair of light fluxes passing through different regions in the pupil of the optical system and output an image data pair from the photoelectric conversion units.

Then, the amount of image shift in each of the regions is calculated by correlation calculation between the image data pair, and the distance calculation unit 4 calculates image shift map data indicating the distribution of the amount of image shift. Also, the distance calculation unit 4 may further convert the amount of image shift into a defocus amount and generate defocus map data indicating the distribution (distribution of the captured image on a two-dimensional plane) of the defocus amount. In addition, the distance calculation unit 4 may also acquire the distance map data of the distance from the object converted from the defocus amount.

It should be noted that the in-vehicle camera system 600 is applied to driver assistance (collision damage reduction) in the present embodiment, but some embodiments are not limited to this example, and the in-vehicle camera system 600 may also be applied to cruise control (including cruise control with a full vehicle speed following function) and automatic driving. In addition, the in-vehicle camera system 600 can also be applied not only to a vehicle, such as the shown vehicle, but also to a movable body (movable apparatus), such as a ship, an aircraft, or an industrial robot. In addition, the in-vehicle camera system 600 can also be applied not only to (provided not only for) the in-vehicle camera 10 according to the present embodiment and a movable body, but also to a wide range of devices that use object recognition, such as an intelligent transport system (ITS).

Modifications

Embodiments and examples of the present disclosure have been described above, but some embodiments are not limited to these embodiments and examples, and various combinations, modifications, and changes are possible within the scope of the concept.

For example, the optical systems according to the individual examples are intended for use in a visible range and are configured to perform good aberration correction throughout an entire visible range. However, the wavelength range in which aberration correction is performed may be changed as necessary. For example, the optical systems may be configured to perform aberration correction only in a specific wavelength range of a visible range or may be configured to perform aberration correction in the wavelength range of the infrared region other than the visible region.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2024-049496, which was filed on Mar. 26, 2024 and which is hereby incorporated by reference herein in its entirety.

What is claimed is:

1. An optical system comprising, in order from an object side to an image side:

a first negative lens having an aspherical object-side surface;

a second negative lens;

a first positive lens; and a third negative lens, wherein the first negative lens is disposed closest to an object, the aspherical surface has an inflection point in a cross section including an optical axis, the first positive lens is disposed adjacent to an aperture stop, and an inequality below is satisfied:

$$-1.20 < f\left(1/fp1 + 1/fp2 + 1/fp3\right) < 0.30,$$

where fp1 is a focal length of the second negative lens, fp2 is a focal length of the first positive lens, fp3 is a focal length of the third negative lens, and f is a focal length of the entire optical system.

2. The optical system according to claim 1, wherein an inequality below is satisfied:

$$1.00 < f \times \sin(\theta\max)/y(\theta\max) \leq 1.90,$$

where y(θ) is a projective characteristic of the optical system that represents a relationship between a half field angle θ and an image height y, θmax is a maximum half field angle of the optical system, and f is a focal length of the optical system.

3. The optical system according to claim 1, wherein an inequality below is satisfied:

$$0.10 < \theta1/w < 1.00,$$

where θ1 is a maximum angle formed by a plane normal and an optical axis and w is a maximum half field angle on an image-side surface of the first negative lens.

4. The optical system according to claim 1, wherein an inequality below is satisfied:

$$0.10 < GnL/TL < 0.70,$$

where GnL is a distance from a surface vertex of an object-side lens surface of the second negative lens to a surface vertex of an object-side lens surface of the third negative lens, and TL is a distance from a surface vertex of an object-side lens surface of the first negative lens to an image plane.

5. The optical system according to claim 1, wherein an inequality below is satisfied:

$$0.70 < STL/GpL < 1.40,$$

where STL is a distance from a surface vertex of an object-side lens surface of the first negative lens to the aperture stop, and GpL is a distance from the surface vertex of the object-side lens surface of the first negative lens to a surface vertex of a lens surface of the first positive lens close to the aperture stop.

6. The optical system according to claim 1, wherein an inequality below is satisfied:

$$0.80 < fp2/f < 7.00.$$

7. The optical system according to claim 1, wherein an inequality below is satisfied:

$$-15.0 < fG1/f < -1.00,$$

where fG1 is a focal length of the first negative lens.

8. The optical system according to claim 1, wherein an inequality below is satisfied:

$$0.20 < \left|yi/yL1\right| < 1.00,$$

where yi is a distance in a radial direction from an optical axis to an inflection point on an object-side surface of the first negative lens, and yL1 is a maximum effective diameter.

9. The optical system according to claim 1, wherein an aspherical lens is disposed closest to an image plane.

10. The optical system according to claim 1, wherein a positive lens is disposed between the first negative lens and the first positive lens.

11. The optical system according to claim 1, wherein at least one of the second negative lens, the first positive lens, and the third negative lens is made of plastic.

12. An image pickup apparatus comprising:

the optical system according to claim 1; and an image pickup element that images an object via the optical system.

13. A system comprising:

the image pickup apparatus according to claim 12; and a determination unit that determines whether the possibility of collision between a movable apparatus and the object is present in accordance with distance information about the object acquired by the image pickup apparatus.

14. The system according to claim 13, further comprising:

a control device that outputs a control signal causing a drive unit of the movable apparatus to generate a braking force when the possibility of collision between the movable apparatus and the object is determined to be present.

15. The system according to claim 13, further comprising:

a warning device that warns a user of the movable apparatus when the possibility of collision between the movable apparatus and the object is determined to be present.

16. The system according to claim 13, further comprising:

a notification device that notifies an outside of information about collision between the movable apparatus and the object.

17. A movable apparatus comprising:

the image pickup apparatus according to claim 13, wherein the movable apparatus is movable while holding the image pickup apparatus.

18. The movable apparatus according to claim 17, further comprising:

a determination unit that determines whether possibility of collision with the object is present in accordance with distance information about the object acquired by the image pickup apparatus.

19. An optical system comprising, in order from an object side to an image side:

a first negative lens having an aspherical object-side surface;

a first plastic lens that is a negative lens;

a second plastic lens that is a positive lens; and a third plastic lens that is a negative lens, wherein the first negative lens is disposed closest to an object, the aspherical surface has an inflection point in a cross section including an optical axis, and the second plastic lens is disposed adjacent to an aperture stop.

* * * * *